(12) United States Patent
Kashima et al.

(10) Patent No.: US 6,454,273 B1
(45) Date of Patent: Sep. 24, 2002

(54) SEAL STRUCTURE

(75) Inventors: Mituhiro Kashima; Sadaaki Hara; Masahide Kanda; Koji Mitushima, all of Tokyo (JP)

(73) Assignee: Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/647,805

(22) PCT Filed: Feb. 18, 2000

(86) PCT No.: PCT/JP00/00922

§ 371 (c)(1),
(2), (4) Date: Oct. 5, 2000

(87) PCT Pub. No.: WO00/49315

PCT Pub. Date: Aug. 24, 2000

(30) Foreign Application Priority Data

| | | | |
|---|---|---|---|
| Feb. 18, 1999 | (JP) | ........ | 11-039839 |
| Mar. 8, 1999 | (JP) | ........ | 11-060178 |
| Apr. 7, 1999 | (JP) | ........ | 11-099703 |
| Jun. 7, 1999 | (JP) | ........ | 11-159515 |

(51) Int. Cl.[7] ................ F16J 9/08; F16J 9/10; F16J 9/20
(52) U.S. Cl. ........................ 277/437; 277/928
(58) Field of Search ................ 277/436, 437, 277/438, 439, 589, 928

(56) References Cited

U.S. PATENT DOCUMENTS

| | | | |
|---|---|---|---|
| 1,347,351 A | * | 7/1920 | Murray |
| 2,596,703 A | * | 5/1952 | Maier |
| 2,597,829 A | * | 5/1952 | Stillwagon |
| 2,742,333 A | * | 4/1956 | Taylor |
| 2,981,232 A | * | 4/1961 | Peras |
| 2,994,571 A | * | 8/1961 | Peras |
| 3,601,419 A | * | 8/1971 | Fern |
| 4,060,023 A | | 11/1977 | Vegella |
| 4,284,280 A | * | 8/1981 | Bertram et al. |
| 4,544,049 A | * | 10/1985 | Shellhause |
| 4,601,235 A | * | 7/1986 | Roberts |
| 5,028,205 A | * | 7/1991 | Kapadia et al. |
| 5,287,951 A | * | 2/1994 | Voit et al. |
| 5,328,178 A | | 7/1994 | Nies |
| 5,346,230 A | | 9/1994 | Schumacher et al. |
| 5,431,415 A | | 7/1995 | Millonig et al. |
| 5,556,139 A | | 9/1996 | Wilkins |
| 5,575,484 A | | 11/1996 | Burke |

FOREIGN PATENT DOCUMENTS

| | | |
|---|---|---|
| DE | 32 15905 A1 | 11/1982 |
| JP | 2-134357 | 11/1990 |
| JP | 4-138160 | 12/1992 |
| JP | 6-39169 | 10/1994 |
| JP | 6-100202 | 12/1994 |

* cited by examiner

Primary Examiner—Anthony Knight
Assistant Examiner—John L. Beres
(74) Attorney, Agent, or Firm—Rabin & Berdo

(57) ABSTRACT

A seal structure of the present invention is composed of a sliding member 2, a supporting member 1 which stores the sliding member 2 slidably, and a seal ring 5 provided between the sliding member 2 and the supporting member 1. The seal ring 5 is formed by a lip section 10 on which a pressure of a hydraulic operating fluid acts and a heel section 11 for supporting a working pressure. Since the seal structure is such that an annular pressure receiving area between an inner circumference and an outer circumference of the lip section 10 is smaller than an annular supporting area between an inner circumference and an outer circumference of the heel section 11, a pressure which acts on the seal ring 5 is reduced and deformation to a sliding surface side of the heel section 11 is prevented.

27 Claims, 20 Drawing Sheets

SEAL STRUCTURE

TECHNICAL FIELD

The present invention relates to an improvement of a seal structure, particularly a seal structure to be used with a hydraulic cylinder or the like.

BACKGROUND ART

Heretofore, there have been seal structures of a bearing section of a hydraulic cylinder or the like which has been disclosed in Japanese Utility Model Laid-Open Publication No. Hei 4-138160 and in which a backup ring is installed so as to prevent a heel section of a seal ring from projecting, and which has been disclosed in Japanese Patent Publication No. Hei 6-100202 and in which an unloading pressure control valve (buffer ring) is provided so as to reduce a pressure which acts on a seal ring.

However, in such conventional seal structures, for example, in the one which is disclosed in Japanese Utility Model Laid-Open Publication No. Hei 4-138160, the inner diameter and the outer diameter of an insertion groove of the seal ring are parallel to each other. A pressure receiving area of the seal ring in an axial direction extends over an entire surface of the inner diameter and outer diameter of a lip, whereby a supporting area of the heel section is almost the same as the pressure receiving area.

Thus, there have been problems such that a pressure of the heel section becomes high when a pressure is high and a deformation projecting into a sliding surface and a pressure grade to the sliding surface are great. Thus, a capacity of scraping of a hydraulic operating fluid film is great and oil leakage arises resulting from the scraping.

Further, the constitution is such that the higher a pressure becomes, the greater the capacity of scraping of a hydraulic operating fluid film becomes. Therefore, there will be problems such that a sliding section enters a non-lubricating state, friction increases, further frictional heat arises, thermal decomposition of the sliding section arises, and abnormal abrasion arises.

Further, in the constitution which is disclosed in Japanese Patent Publication No. Hei 6-100202 and in which the buffer ring and the seal ring are combined, the buffer ring is not constituted such that the buffer ring is completely airtight so as to secure a hydraulic operating fluid film. Therefore, there will be problems such that for example, in a flow regenerative circuit in which the pressure of an oil room on the side of a rod becomes high in either case of the expansion and shrinkage of a hydraulic cylinder, a pressure between the seal ring and the buffer ring is accumulated and it is impossible to prevent a high pressure from acting on the seal ring when a load pressure operates for a long period of time.

An object of the present invention is to provide a seal structure which solves these problems.

DISCLOSURE OF THE INVENTION

In order to solve the problems mentioned above, the present invention is made and characterized in that in seal structure which is composed of a sliding member, a supporting member for supporting the sliding member slidably, and a seal ring provided between the sliding member and the supporting member, the seal ring is stored in a storage concavity section and has a lip section on which a pressure of a hydraulic operating fluid acts and a heel section for supporting on a side wall surface of the storage concavity section a pressure which acts on the seal ring, and an annular pressure receiving area between an inner circumference and an outer circumference of the lip section is rendered to be smaller than an annular supporting area between an inner circumference and an outer circumference of the heel section.

The constitution is such that the seal ring is provided either at the supporting member or the sliding member.

Thus, since the pressure receiving area of the lip section is smaller than the supporting area of the heel section, when a pressure of the hydraulic operating fluid acts on the lip section, thrust to deform the seal ring becomes small. Moreover, since the supporting area of the heel section is larger than the pressure receiving area of the lip section, a pressure which arises at the heel section is reduced. Thus, it is possible to prevent the heel section from projecting into a sliding surface, whereby reliability on resistance to oil leakage can be enhanced. Further, since a pressure of the heel section can be reduced in a constant ratio, it is possible to prevent the heel section from coming into contact with the sliding surface when a high pressure acts and the friction can be reduced. Also, since a pressure of the heel section is rendered to be small, it is possible to make a critical working pressure of the seal ring higher and to eliminate a pressure reducing mechanism, such as a buffer ring. Therefore, a size of the seal in a sliding direction can be reduced and entire seal structure can be miniaturized. Since a shape of the seal is not symmetrical, it is possible to expect such effects that an error in assembling the seal ring can be prevented and sealing performance can certainly be secured.

Since the heel section of the seal ring is composed of a tapered surface which is away from the lip section in an opposite direction toward the sliding surface of the seal ring, deformation force of the seal is released in a direction of a bottom of a groove when a high pressure acts on the seal, the pressure is more uniformly distributed over the supporting surface, and it is possible to prevent the heel section from projecting into or sticking to the sliding surface.

It is constituted such that the heel section of the seal ring and a retaining member to retain the heel section are provided at the storage concavity section, and a space which becomes larger in an opposite direction toward the sliding surface of the heel section is provided when a pressure of a hydraulic operating fluid is not acting on a contact surface of the heel section and the retaining member. Therefore, the seal is certainly deformed in an opposite direction toward the sliding surface and a deformation of the seal on the sliding member side is suppressed, whereby a pressure and a pressure grade to the sliding member is hardly affected by a working pressure and a very stable sealing function can be realized.

It is constituted such that a tapered surface is formed at an outer circumference of a middle section which connects the lip section and the heel section of the seal ring. Therefore, a pressure of the lip section does not directly act on the supporting surface of the heel section, the distribution of a pressure is dispersed along the tapered surface, and it is possible for the heel section to have a uniform distribution of the pressure extending over an entire supporting surface of the heel section.

There is provided a hydraulic operating fluid draining groove for leading to the heel section a hydraulic operating fluid which exists between the tapered surface of the middle section and an inner circumferential section of the storage concavity to store the seal ring. Therefore, even though a high pressure which acts on the lip section leaks out to the tapered surface, it is possible to discharge the pressure to the side of the heel section under an atmospheric pressure using the hydraulic operating fluid draining groove. Thus, it is possible to prevent the tapered surface from being added to a pressure receiving area of the lip section on which a high pressure acts.

A space is provided between an inner circumference on the heel section side and a piston rod, and also a predetermined space for absorbing a deformation of the seal ring is formed between an outer circumference of the heel section and an inner circumference of the storage concavity section.

A space is provided between an inner circumference on the heel section side and the piston rod, a pressure receiving area of the lip section and a supporting area of the heel section are almost identically formed, and a predetermined space for absorbing a deformation of the seal ring is formed between an outer circumference of the heel section and an inner circumference of the storage concavity section.

It is constituted such that a total capacity of the aforementioned spaces provided between the inner circumference on the heel section side and the piston rod and between the outer circumference of the heel section and the inner circumference of the storage concavity section is 10 to 35 percent of a volume of an annular cylindrical body which is under projection of the pressure receiving area of the lip section, and a capacity of the space provided between the outer circumference of the heel section and the inner circumference of the storage concavity section is 0.6 times more than that of the space provided between the inner circumference of the heel section and the piston rod.

It is constituted such that the total capacity of the spaces provided between the inner circumference on the heel section side and the piston rod and between the outer circumference of the heel section and the inner circumference of the storage concavity section is 20 to 45 percent of a volume of the seal ring, and a capacity of the space provided between the outer circumference of the heel section and the inner circumference of the storage concavity section is 1.0 time more than that of the space provided between the inner circumference of the heel section and the piston rod.

The space between an outer circumference of the heel section and an inner circumference of the storage concavity section is provided in a shape of concavity at the storage concavity section of a cylinder head.

The space between the outer circumference of the heel section and the inner circumference of the storage concavity section is provided in a shape of concavity at the seal ring.

An outer circumference of the heel section of the seal ring has a shape of taper.

There is provided an annular groove which forms a plurality of spaces between the outer circumference of the heel section of the seal ring and the storage concavity section.

A middle section in a shape of taper is formed between the lip section and the heel section of the seal ring, and a space is provided between the middle section of the seal ring and an inner circumference of the storage concavity section which faces the middle section.

The middle section of the seal ring and an inner circumference of the storage concavity section which is in contact with the middle section are formed in a shape of arc.

An outer circumference of the heel section of the seal ring is formed by a plurality of step sections which have different diameters.

Due to the constitution described above, a space having a capacity corresponding to a volume of the deformation of the seal ring resulting from a pressure which acts on the lip section is provided on the outer circumference side of the heel section, a deformation of the seal ring resulting from the working pressure is led to the space, and a deformation to the inner circumference side of the seal ring can be made small to such an extent that can almost be ignored. Therefore, interference of the heel section and the piston rod can be prevented and it is possible to eliminate nonconformity, such as abnormal abrasion or deterioration of durability of the seal ring resulting from frictional heat or an increase in friction.

Further, it is possible to deter a deformation of the heel section to the piston rod side. Therefore, pressure resistance can be improved, and also sealing performance and durability can be secured even under the condition of a high pressure which is higher than usual.

There is provided a pressure draining hole to discharge a pressure which exists between an outer circumference of the seal ring and an inner circumference of the storage concavity section to store the seal ring in such a manner that the pressure draining hole penetrates the cylinder head.

There is provided a pressure draining groove to lead to the heel section side a pressure which exists between an outer circumference of the seal ring and an inner circumference of the storage concavity section to store the seal ring.

Since the pressure draining hole is provided at a supporting member or the pressure draining groove is provided at the seal ring, a pressure in the space can be discharged to the side of an atmospheric pressure utilizing the pressure draining hole or the pressure draining groove and it is possible to prevent a fluid remaining in the space from hindering a deformation of the seal ring.

An elastic member which allows and absorbs a deformation of the seal ring to the outer circumference side is arranged in the space for absorbing a deformation of the seal ring.

A void is provided at least either between the elastic member and the seal ring or between the elastic member and the supporting member.

The elastic member is closely stored in a space section.

Due to the constitution described above, the seal ring is composed of its body and an elastic member which is provided at an outer circumference of the body, and by taking a shape of the elastic member, characteristic of the material, a capacity of the space section, or the like into consideration, a deformation to the outer circumference side is allowed in proportion to a pressure which acts on the lip side and also the deformation can be absorbed, whereby it is possible to make the change of a size of the inside diameter almost zero. Thus, contact or engagement with the piston rod can be prevented and the problems, such as an increase in friction or oil leakage can be solved.

Further, the elastic member and the seal ring are different parts, and therefore it is possible to freely control a deformation of the seal ring by freely changing the shape or material of the elastic member.

Further, since the seal ring and the elastic material are divided, shapes of the respective parts can be simplified, whereby expenses for dies will be reduced and work efficiency will be improved.

By holding down a variation in size of the inside diameter of the seal ring, a stress which arises at an inside diameter section can be decreased, fatigue strength of the seal improves, and durability improves.

Further, by providing predetermined spaces on the inner circumference side and the outer circumference side of the elastic member and in combination with the elastic characteristic of the elastic member, it is also possible to control a deformation of the seal ring.

There is provided a communicating hole for connecting a oil room and the storage concavity section to which an outer circumference of the lip section of the seal ring adheres closely. The communicating hole has a diameter almost same as that of the storage concavity section.

A constricted part is provided at an outer circumferential section which exists between the lip section and the heel section of the seal ring, and an annular pressure receiving area between an inner circumference and an outer circumference of the constricted part is formed to be smaller than an annular supporting area between an inner circumference and an outer circumference of the heel section. Further, there is provided a communicating hole for connecting a oil room and the storage concavity section which adheres closely to an outer circumference of the lip section of the seal ring. The communicating hole has a size larger than an outside diameter of the constricted part.

In a seal ring, a pressure receiving area of a lip section or a constricted part on which a pressure of a lubricating material acts is smaller than a supporting area of a heel section. A storage concavity of a supporting member in which the seal ring is stored is formed so that an oil room and the storage concavity section which adheres closely to an outer circumference of the lip section are connected via a communicating hole having a diameter almost same as an inside diameter of the storage concavity section or larger than an outside diameter of the constricted part.

In order to assemble the seal ring, it will be sufficient if the seal ring passes through the communicating hole and the storage concavity section of a supporting member which is in contact with an outer circumference of the lip section of the seal ring. Thus, it is possible to hold down the quantity of deformation of each part, whereby damage of parts will be prevented, precision in assembling parts will be increased, and work efficiency will be improved. Further, a cutting amount in boring can be reduced and it is possible to increase processing precision or reduce expenses for processing.

Cutting work of the storage concavity section adherent closely to the outer circumference of the lip section which will be a great contribution to the sealing performance can be changed from boring to ordinary inside diameter processing. This produces such effects that roughness of a surface to be processed and dimensional accuracy can be increased and the management can be facilitated.

Since the pressure receiving area of the lip section is smaller than the supporting area of the heel section, even though a high pressure of a hydraulic operating fluid directly acts on the lip section without buffer ring, thrust to deform the seal ring becomes small. Moreover, since the supporting area of the heel section is larger than the pressure receiving area of the lip section, a pressure which arises at the heel section is reduced. Therefore, it is possible to prevent the heel section from projecting into the sliding surface and improve reliability on resistance to oil leakage can be enhanced. Further, since a pressure of the heel section can be reduced in a constant ratio, it is possible to restrain the heel section from coming into contact with the sliding surface when a high pressure acts, and friction can be reduced.

Further, a shape of the seal ring is not symmetrical with respect to a direction perpendicular to a central axis of the sliding member, and therefore there is expectation of such an effect that an error in assembling the seal ring is prevented.

In addition, a pressure which acts on the lip section is also reduced because the pressure receiving area becomes small, and a level of pressure resistance of the supporting member can be reduced. As a result, it is possible to make an outside diameter of the supporting member small, thereby being effective in reducing the weight of the supporting member and lowering costs.

In addition to the effects described above, since a dimensional regulation of the lip section is released, an effect of enhancing a degree of freedom of shape is produced.

There is provided a hydraulic operating fluid draining hole, which penetrates the supporting member and fronts on the outer circumferential section of the seal ring, for discharging a hydraulic operating fluid which exists between the outer circumferential section of the seal ring and the inner circumferential section of the storage concavity section to store the seal ring.

Further, there is provided a hydraulic operating fluid draining groove for leading to the heel side a hydraulic operating fluid which exists between the outer circumferential section of the seal ring and the inner circumferential section of the storage concavity section to store the seal ring.

Since the hydraulic operating fluid draining hole is provided at the supporting member or the hydraulic operating fluid draining groove is provided at the seal ring, even though a high pressure which acts on the lip section leaks out to a tapered surface, the pressure can be discharged to the atmospheric pressure side using the hydraulic operating fluid draining hole or the hydraulic operating fluid draining groove. Thus, it is possible to prevent the tapered surface from being added to the pressure receiving area of the lip section on which the high pressure acts.

BEST MODE FOR CARRYING OUT THE INVENTION

Embodiments of the present invention will subsequently be described with reference to the accompanying drawings.

Figure 1:
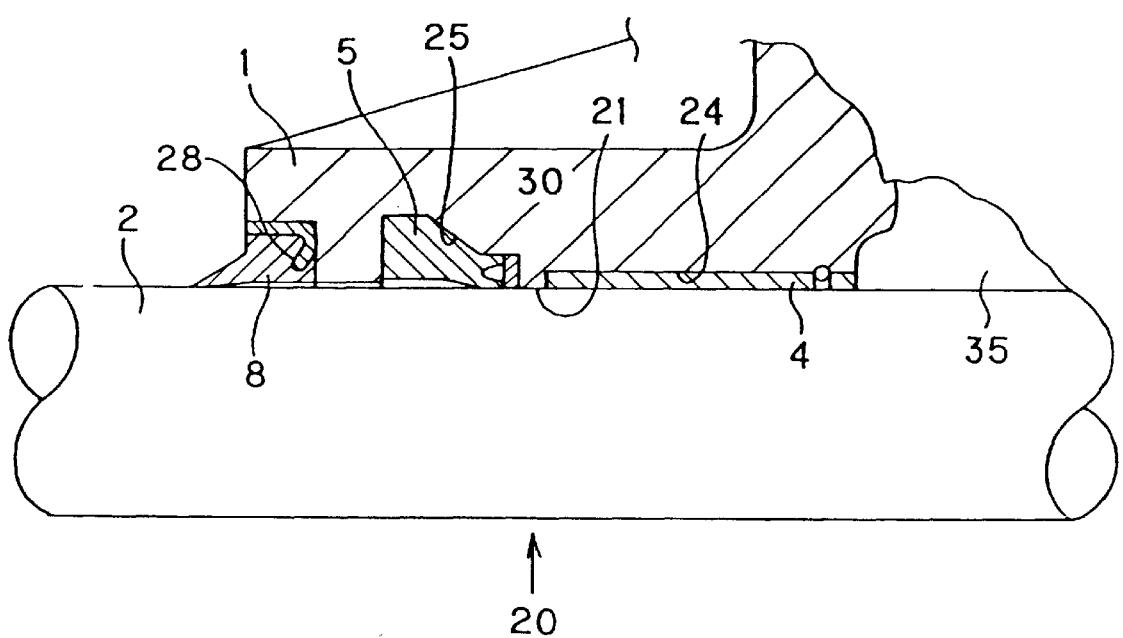
FIG. 1 is a block diagram showing a first embodiment according to the present invention.
Figure 2:
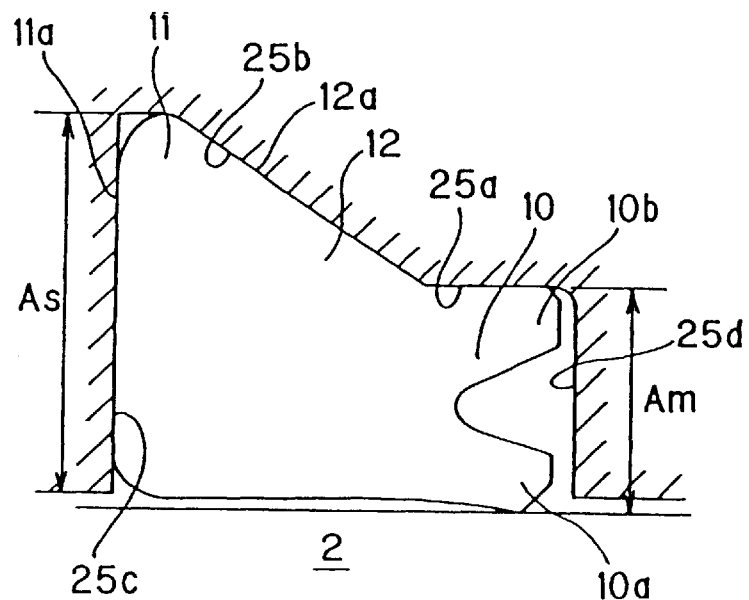
FIG. 2 is a sectional view of a principal part showing a detailed shape of a seal ring similarly.
Figure 3:
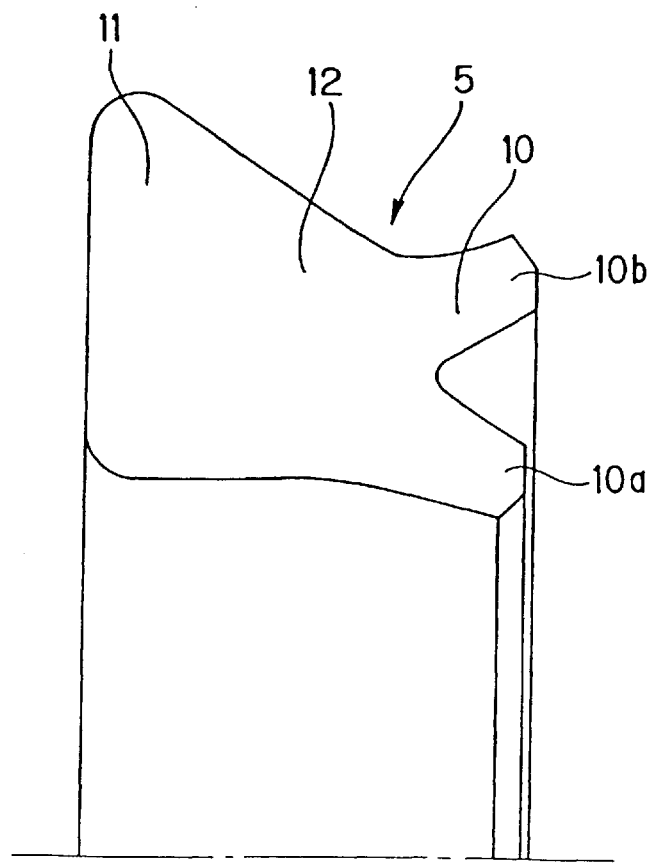
FIG. 3 is a broken view showing a shape of the seal ring on which no pressure acts similarly.

As shown in FIGS. 1 through 3, a piston rod 2 of a hydraulic cylinder 20 penetrates a sliding hole 21 of a cylinder head 1 in such a manner that the piston rod 2 can freely slide, and a bearing section 30 is formed at the penetration section. A bearing 4 and a seal ring 5 are arranged at the bearing section 30, and further a dust seal 8 is provided at the outermost location. The seal ring 5 is stored in a storage concavity 25 in a shape of annular groove which is formed at the sliding hole 21.

The seal ring 5 is composed of a lip section 10 which directly receives a pressure of a hydraulic operating fluid in a rod side oil room of the hydraulic cylinder 20, a heel section 11 for receiving the pressure which acts on the lip section 10 at the storage concavity section 25 of the cylinder head 1, and a middle section 12 which connects the lip section 10 and the heel section 11. The lip section 10 is divided into an inner circumferential lip 10a and an outer circumferential lip 10b. An outside diameter of the outer circumferential lip 10b of the lip section 10 is smaller than that of the heel section 11, and also an outside diameter of the middle section 12 is formed by a tapered surface 12a which gradually expands toward the heel section side from the lip section side.

The storage concavity section 25 of the cylinder head 1 which stores the seal ring 5 also has a groove cross section corresponding to an outline of the seal ring 5. The storage concavity section 25 is composed of a lip bottom wall 25a which is in contact with an outer circumference of the outer circumferential lip 10b of the lip section 10, an inclined wall section 25b which is in contact with the tapered surface 12a provided at an outer circumference of the middle section 12, a heel wall 25c which is in contact with a supporting surface 11a of the heel section 11, and a lip longitudinal wall 25d which receives a pressure of a hydraulic operating fluid together with the lip section 10. In order to prevent a pressure which acts on the lip section 10 from directly acting on the heel section 11 and the middle section 12 (in other words, in order to prevent a hydraulic operating fluid from leaking out to the heel section and the middle section 12), it is arranged such that an outer circumference of the outer circumferential lip 10b of the lip section 10 adheres closely to an inner surface of the lip bottom wall 25a of the storage concavity section 25 with a fixed interference.

More specifically, a pressure receiving area Am of the lip section 10 is an annular area between an inner circumference of the lip section 10 which slides relatively to the piston rod 2 and an outer circumference of the lip section 10 at the time of assembling the seal ring. On the other hand, an annular area between an outer circumference and an inner circumference of the heel section 11 is a supporting area As of the heel section 11. The relationship between the pressure receiving area and the supporting area is "Am<As."

Incidentally, also as shown in FIG. 3, when the seal ring 5 is under no pressure, the lip 10a on the inner circumference side of the lip section 10 is formed such that the lip 10a shrinks to the inner diameter side by a portion equivalent to the interference so as to come into contact with the piston rod 2 by a predetermined pressure. Further, an outer circumference of the outer circumferential lip 10b on the outer circumference side is formed such that the outer circumference expands to the outside diameter side by a portion equivalent to the interference, and the outer circumference adheres closely to an inner surface of the storage concavity section 25.

The constitution is as described above. Next, operation will be described.

Figure 4:
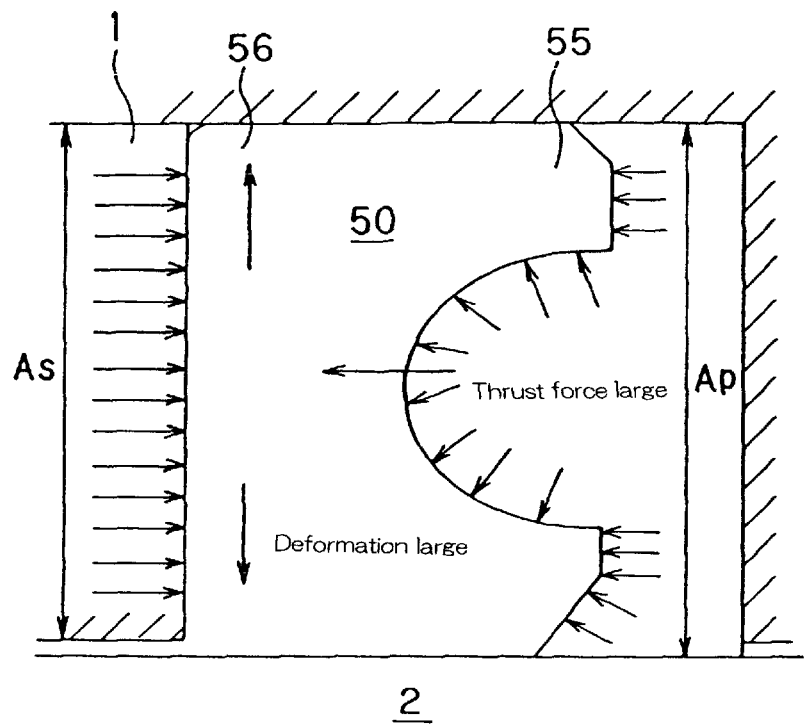
FIG. 4 is a typical view showing a working pressure and a deformation in a conventional shape of a seal ring.

In a conventional type shown in FIG. 4, an inside diameter and an outside diameter of a fitting groove of a seal ring 50 are parallel to each other, and a pressure receiving area Ap of a lip section 55 of the seal ring 50 is large and almost the same as a supporting area As of a heel section 56. Thus, thrust resulting from a pressure which acts on the lip section 55 becomes large and a pressure of the heel section 56 also becomes large. Therefore, the heel section 56 is crushed and is deformed, but its outside diameter side is restricted by the cylinder head 1, whereby the deformation concentrates on the side of the piston rod 2. This causes such problems that a part of the heel section 56 comes into hard contact with the piston rod 2 and friction increases.

Figure 5:
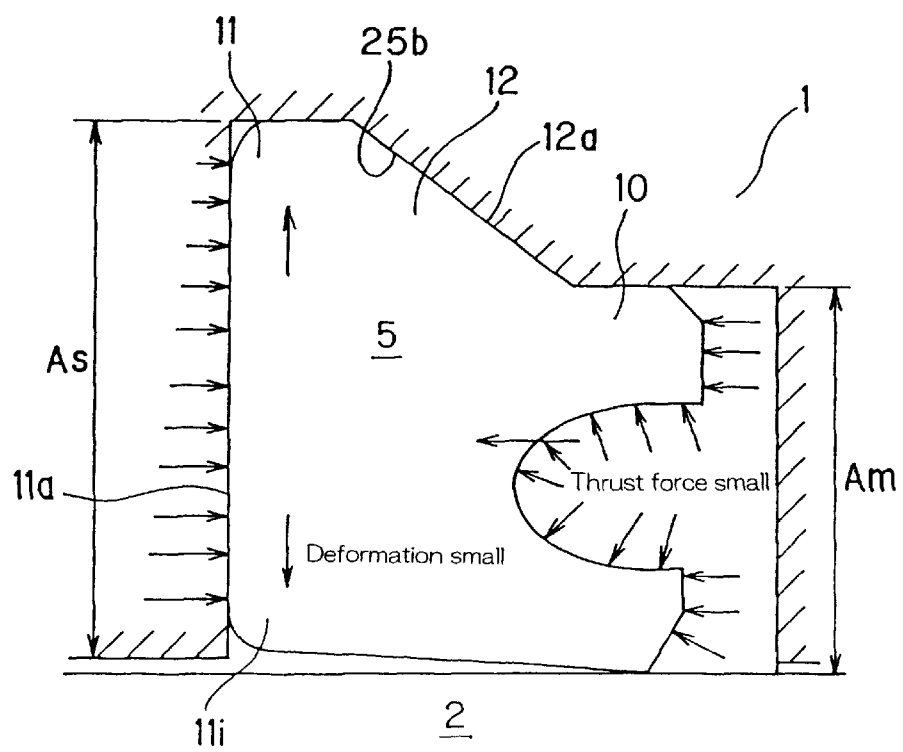
FIG. 5 is a typical view showing a working pressure and a deformation of a seal ring according to the first embodiment.

On the other hand, in the present invention having a shape as shown in FIG. 5, since the pressure receiving area Am of the lip section 10 is rendered to be small, thrust which acts on the seal ring 5 is restrained and a pressure of the heel section 11 can be lowered. Thus, a deformation of the seal ring 5 can be reduced. Also, it is possible to prevent projecting into the piston rod 2 of a corner section 11i of the heel section 11, and it is possible to prevent abnormal abrasion by a decrease of friction or oil leakage which may occur resulting from scraping a hydraulic operating fluid by a decrease of friction.

Also, it is possible to increase a pressure which acts on the lip section 10, thereby eliminating a need for a decompression member, such as a buffer ring, which has been previously installed so as to restrain a pressure from being applied to the seal ring 5.

Further, since an outline of the middle section 12 is formed by the tapered surface 12a which gradually expands toward the heel section 11 from the lip section 11, a distribution of pressure of the lip section 10 does not exactly act on the supporting surface 11a of the heel section 11, the distribution of pressure disperses along the tapered surface 12a, and the pressure disperses throughout the supporting surface 11a of the heel section 11. Thus, it is possible to make the pressure which acts on the heel section 11 lower than a pressure which acts on the lip section 10 in the area ratio.

Figure 6:
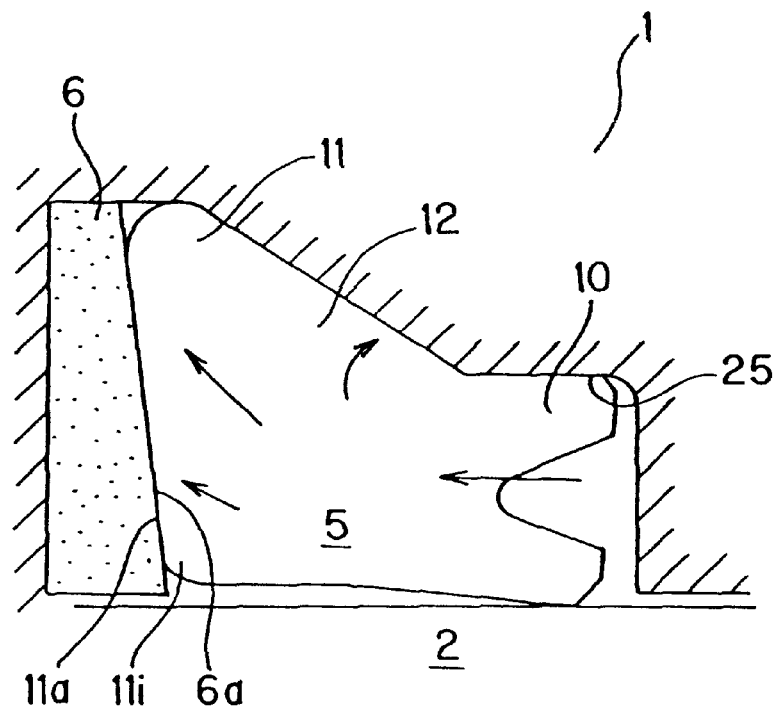
FIG. 6 is a sectional view of a principal part showing a shape according to a second embodiment.

A second embodiment is shown in FIG. 6. It is constituted such that a backup ring 6 is arranged on a back surface of the seal ring 5, and the supporting surface 11a of the heel section 11 of the seal ring 5 and a contact surface 6a of the backup ring 6 which faces the supporting surface 11a are rendered to be tapered surfaces.

The supporting surface 11a of the heel section 11 is formed by a tapered surface in such a manner that an outside diameter section is farther away from the lip section 10. Also, a deformation of the seal ring 5 resulting from a pressure of a hydraulic operating fluid applied is released in a direction of a groove bottom. Therefore, the distribution of a pressure of the supporting surface 11a can further be made uniform, it is possible to more effectively prevent projecting or sticking in a direction of the piston rod 2 of the corner section 11i of the heel section 11, and it is possible to prevent the abnormal pressure of the corner section 11i on the inside diameter side of the heel section 11 and the pressure grade from arising.

Incidentally, in this embodiment, the tapered surface (the contact surface 6a) is formed using the backup ring 6 in consideration of workability of the storage concavity section 25, but of course it is also preferable to directly form the tapered surface at the storage concavity section 25.

Figure 7:
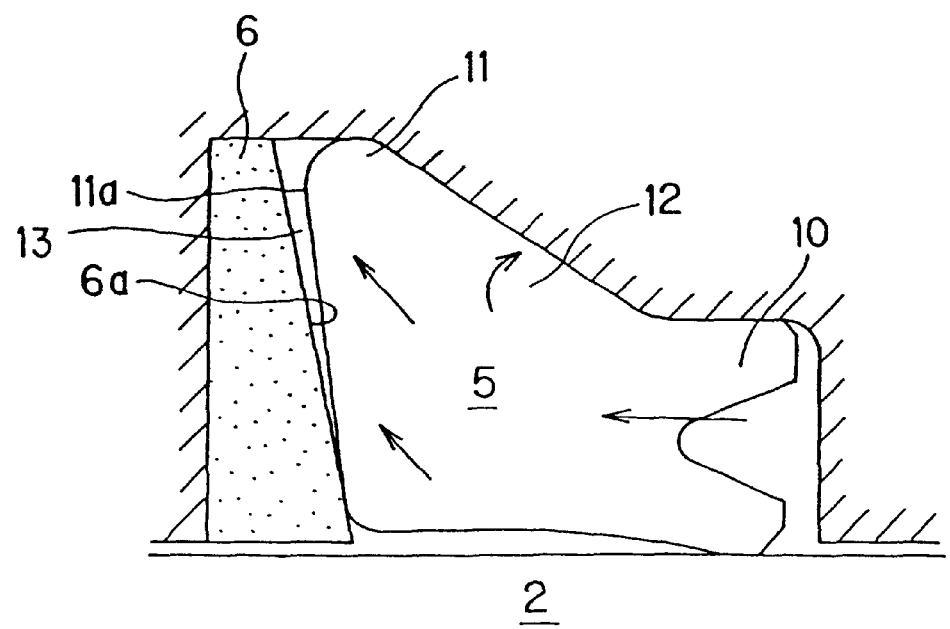
FIG. 7 is a sectional view of a principal part showing a shape according to a third embodiment.

FIG. 7 shows a third embodiment. The third embodiment is such that in the seal ring according to the second embodiment, a taper angle of the supporting surface 11a of the heel section 11 and a taper angle of the contact surface 6a of the backup ring 6 which faces the supporting surface 11a are set to be different in order to form, between the tapered heel section 11 of the seal ring 5 and the backup ring 6 to retain the heel section 11, a space 13 which gradually becomes larger in a direction of the outside diameter of the heel section 11 when a pressure of the hydraulic operating fluid is not acting.

In this case, the deformation of the seal ring can be led in a direction of the bottom of the groove more than the second embodiment, whereby a pressure and a pressure grade against the piston rod 2 is not easily affected by a working pressure of the heel section 11 and a very stable sealing function can be realized.

Figure 8:
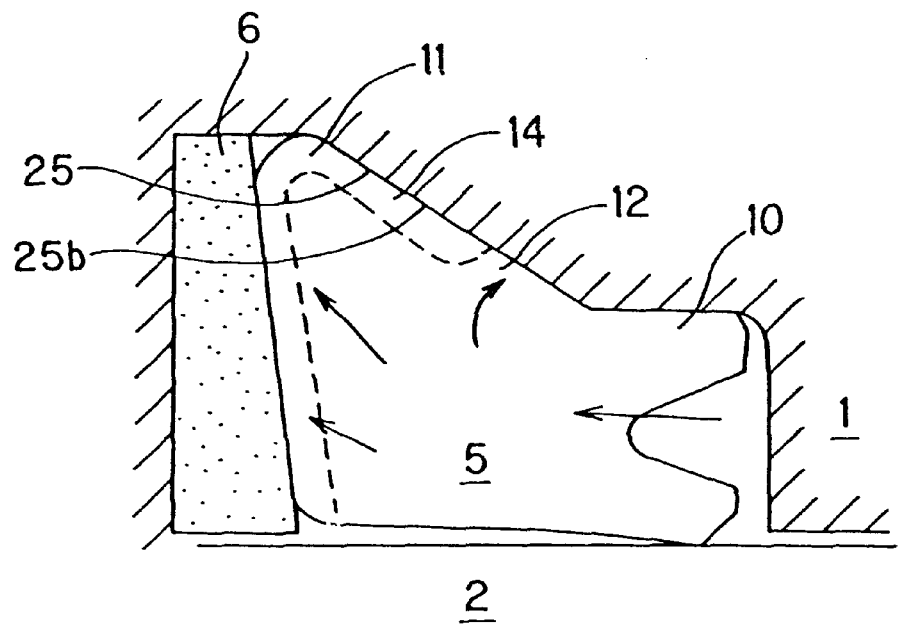
FIG. 8 is a sectional view of a principal part showing a shape according to a fourth embodiment.

Further, a fourth embodiment is shown in FIG. 8. In this embodiment, there is provided a hydraulic operating fluid draining groove 14 for discharging a hydraulic operating fluid, which exists between an outer circumferential section of the seal ring and an inner circumferential section of the storage concavity section 25, to the heel section 11 under an atmospheric pressure.

This prevents an effect which has been produced by reducing the pressure receiving area of the lip section 10 from being spoiled. In other words, if a hydraulic operating fluid enters into the middle section 12, the tapered surface 12a of the middle section 12 will be added as the pressure receiving area of the lip section 10 and the pressure receiving area and the supporting area will be of the almost the same size, thereby spoiling the effect.

Due to such constitution, a hydraulic operating fluid which remains between the middle section 12 of the seal ring 5 and the inclined wall section 25b of the storage concavity section 25 is discharged from the hydraulic operating fluid draining groove 14 to the side of the heel section 11 under an atmospheric pressure. Therefore, it is possible to prevent the hydraulic operating fluid from pressurizing the tapered surface 12a of the middle section 12 and the pressure receiving area from increasing.

Figure 9:
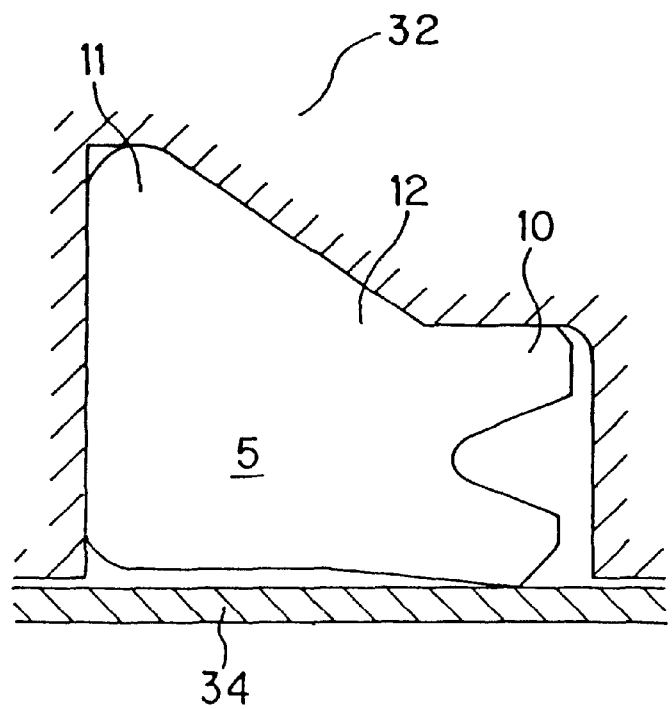
FIG. 9 is a sectional view of a principal part showing a shape according to a fifth embodiment.

A fifth embodiment is shown in FIG. 9. This embodiment is such that the seal ring 5 is installed at a piston 32 which slides relatively to a cylinder tube 34 which is a supporting member. Fundamental constitution of the seal ring 5 according to the fifth embodiment is same as that of the first embodiment.

In this case, the seal ring 5 is arranged so that the lip section 10 faces an oil room on the side which a high pressure acts much more. If a high pressure acts on both directions of the piston or the like, further two seals should be arranged in the opposite directions.

Figure 10:
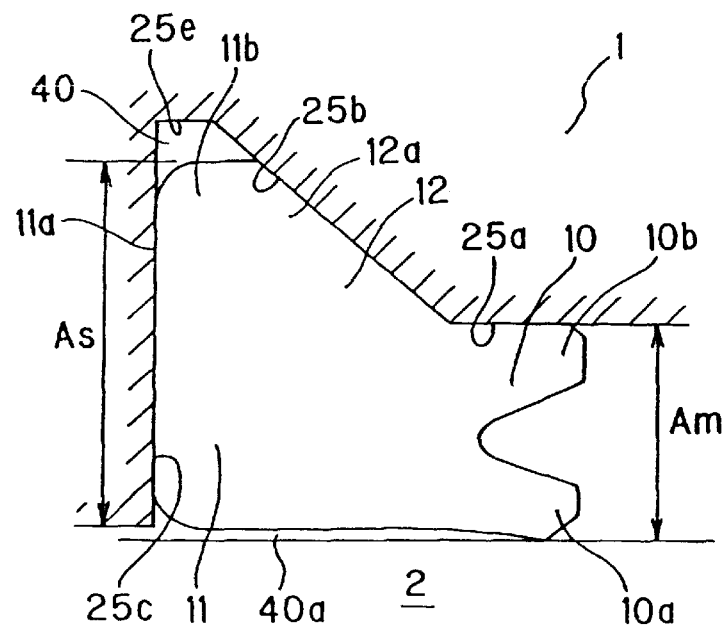
FIG. 10 is a sectional view of a principal part showing a detailed shape of a seal ring according to a sixth embodiment.

Next, a sixth embodiment will be described with reference to FIG. 10.

In this embodiment, as shown in the drawing, an annular space 40 for absorbing a compressed and deformed portion of the seal ring 5 when a high pressure acts is formed between the outer circumferential section 11b of the heel section 11 and a heel bottom wall 25e of the storage concavity section 25. Details, such as a required capacity or the like, will be described as well as the following operations.

In the conventional type shown in FIG. 4, as described above, the inside diameter and the outside diameter of the fitting groove of the seal ring 50 are parallel to each other, the pressure receiving area Ap of the lip section 55 of the seal ring 50 is large and almost the same as the supporting area As of the heel section 56, and a part of the heel section 56 comes into hard contact with the piston rod 2, thereby causing problems, such as an increase of friction or the like.

Figure 11:
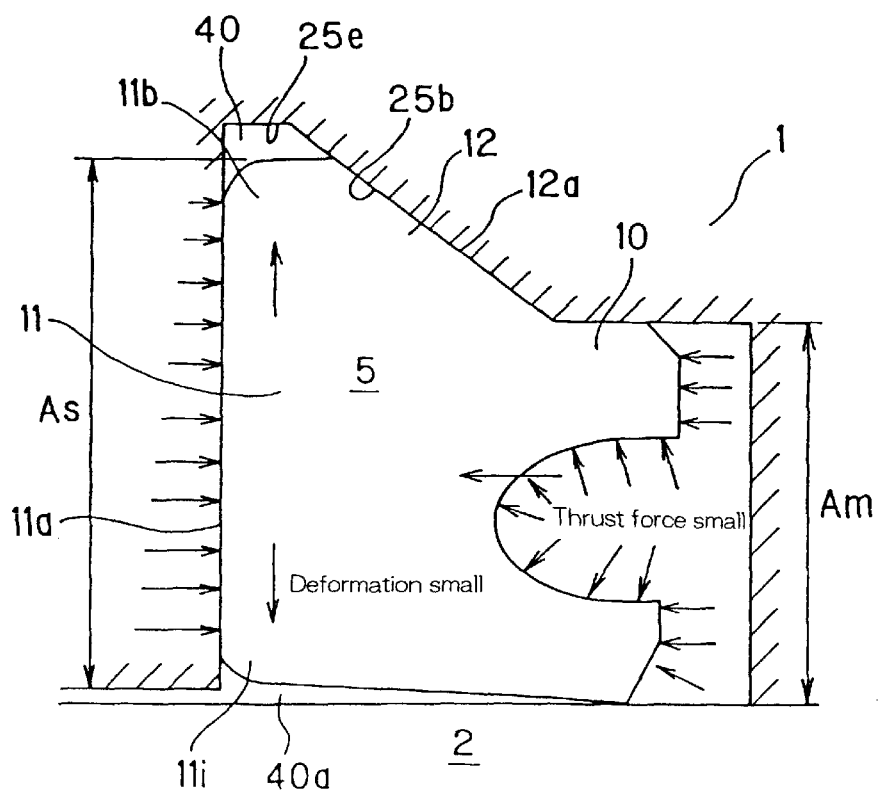
FIG. 11 is a typical view showing a working pressure and a deformation of the seal ring according to the sixth embodiment.

On the other hand, in this embodiment shown in FIG. 11, there are the following operations as well as operations of the seal ring having the constitution shown in FIG. 5 described above due to the annular space 40 installed in such a manner that the space 40 is in contact with the outer circumferential section 11b of the heel section 11.

A capacity of the annular space 40 to be formed between the outer circumferential section 11b of the heel section 11 of the seal ring 5 and the heel bottom wall 25e of the annular concavity section 25 is set so that the capacity corresponds to a volume based on the deformation of height H of an annular cylinder resulting from a pressure to act on the lip section 10. The height H is defined by dividing a volume of the annular cylinder, which is under projection of the pressure receiving area of the lip section 10, by the pressure receiving area. By setting the capacity of the annular space 40 in such a manner, the deformation of the seal ring 5, namely, a volume equivalent to a reduced portion of the height H of the annular cylinder is mostly absorbed by getting into the space 40. Thus, the inside diameter of the seal ring 5 is scarcely deformed, whereby it is possible to securely prevent nonconformity, such as an increase in friction of the sliding section or oil leakage, which may arise resulting from a dimensional change on the inside diameter side of the seal ring 5.

Thus, the dimensional change on the inside diameter side of the seal ring 5 can be restricted covering a wide range of the seal ring 5 on which a pressure acts, and a stable sealing function can be carried out up to a high pressure zone.

Incidentally, the inventor and the like considered a deformation of a seal ring as a deformation of an annular cylindrical body, made an annular cylindrical model which the lower surface is supported and the upper surface is loaded with a uniformly distributed load, and then analyzed and confirmed a deformation of the model by changing the supporting conditions of the inner circumference and outer circumference.

As a result, it is certified that if the inner circumference and outer circumference of the model are in a "free state," namely under no pressure, both of these circumferences will expand the diameters, and if the inner circumference is in a free state and the outer circumference is in a restricted state, the inner circumferential diameter will shrink as shown in Table 1.

Judging from the results, it is confirmed that if expansion of the outside diameter is controlled like the present invention, the inside diameter will not be deformed at all.

Further, the inventor studied in detail the requirements for not deforming the inside diameter at all. As a result, it is certified that the total capacity of the space 40 and spaces other than the space 40, for example, a space 40a which exists on a sliding surface of an inside diameter section of the seal ring 5 and the piston rod 2 is preferable to be 10 to 35 percent of the volume of the seal ring 5. It is also certified that the total capacity of spaces on the outer circumference side of the seal ring 5 including the annular space 40 which exists on the outer circumference side is preferable to be 0.6 times more than the total capacity of spaces on the inner circumference side of the seal ring 5.

TABLE 1

| Part | Inside and outside diameters are in free state | Inside diameter is in free state and expansion of outside diameter is controlled | Inside diameter is in free state and outside diameter is restricted |
|---|---|---|---|
| Variation in size of outside diameter | Expansion of diameter (+) | Volume corresponding to crushed portion of thickness of model is released to outer circumferential section | No variation (restricted) |

TABLE 1-continued

| Part | Inside and outside diameters are in free state | Inside diameter is in free state and expansion of outside diameter is controlled | Inside diameter is in free state and outside diameter is restricted |
|---|---|---|---|
| Variation in size of inside diameter | Expansion of diameter (+) | No variation (0) is target value | Shrinkage of diameter (−) |

Figure 12:
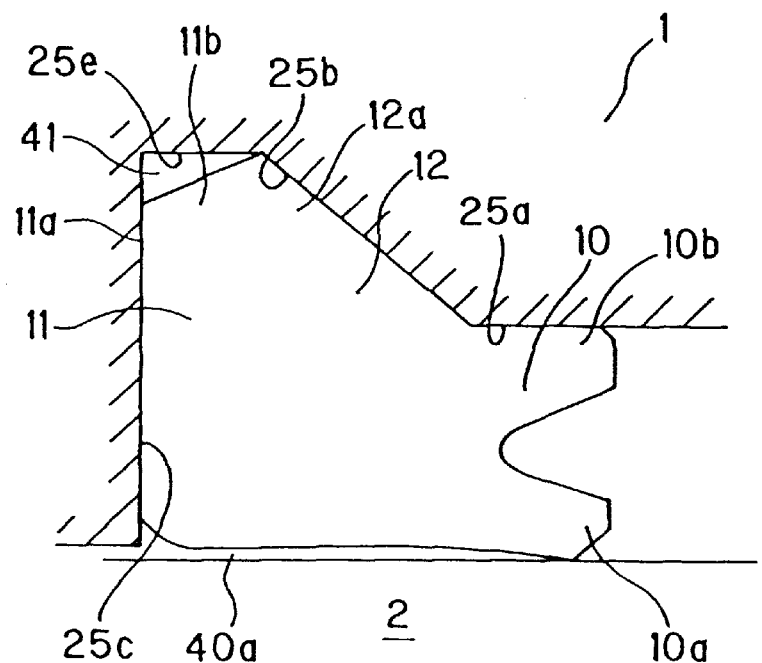
FIG. 12 is a sectional view of a principal part showing a shape according to a seventh embodiment.

A seventh embodiment is shown in FIG. 12. This embodiment is such that the outer circumferential section 11b near the heel section 11 of the seal ring 5 which faces the heel bottom wall 25e of the storage concavity section 25 is formed in a tapered shape and an annular space 41 having a triangular cross section is formed between the storage concavity section 25 and the heel section 11. In other words, it is also preferable to modify the shape of the seal ring 5 and install the deformation absorbing space 40 of the seal ring 5.

Figure 13:
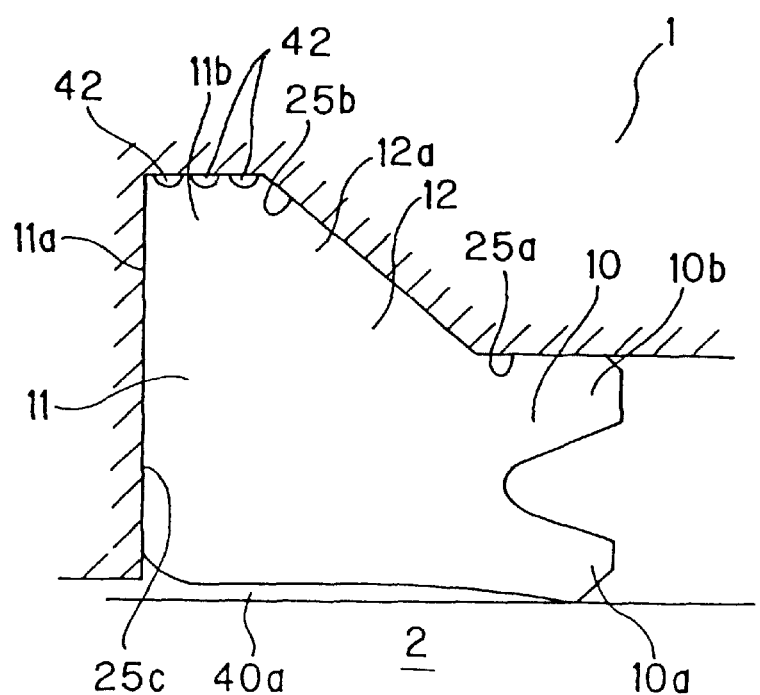
FIG. 13 is a sectional view of a principal part showing a shape according to an eighth embodiment.

An eighth embodiment is shown in FIG. 13. In this embodiment, it is first arranged such that the heel bottom wall 25e of the storage concavity section 25 is in contact with the outer circumferential section 11b of the heel section 11 of the seal ring 5, and then a plurality of concave annular spaces 42 are provided on an outer circumferential surface of the outer circumferential section 11b of the heel section 25.

Figure 14:
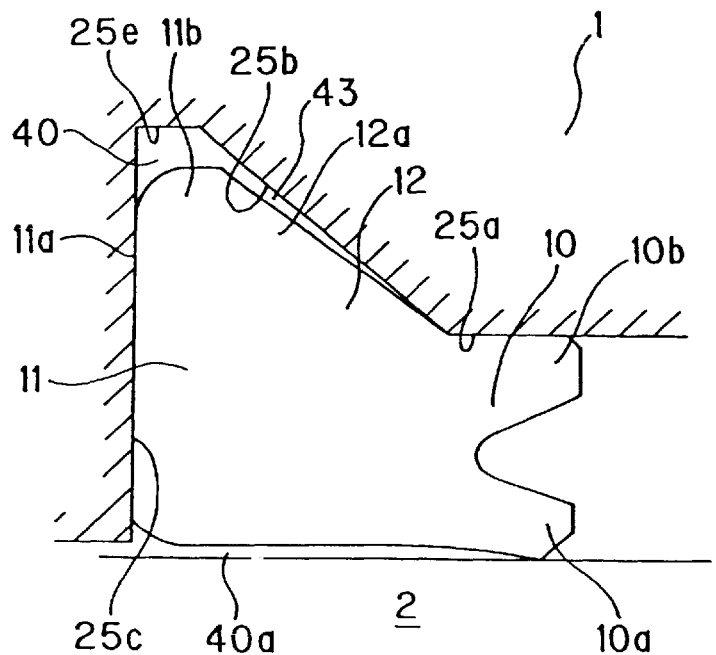
FIG. 14 is a sectional view of a principal part showing a shape according to a ninth embodiment.

A ninth embodiment is shown in FIG. 14. This embodiment is such that in addition to the space 40 which exists between the outer circumferential section 11b of the heel section 11 and the heel bottom wall 25e of the storage concavity section 25, a space 43 is also provided between the tapered surface 12a of the middle section 12 of the seal ring 5 and the inclined wall section 25b of the storage concavity section 25.

Figure 15:
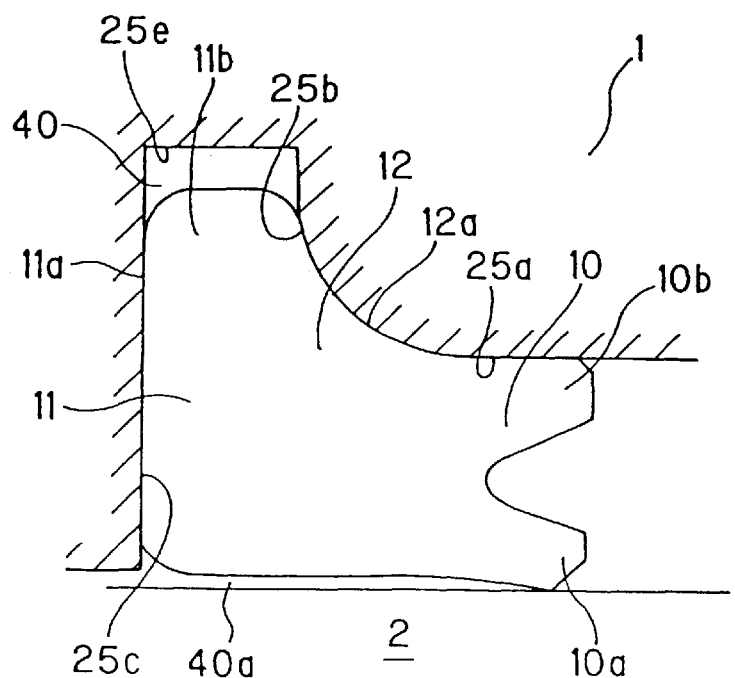
FIG. 15 is a sectional view of a principal part showing a shape according to a tenth embodiment.

A tenth embodiment is shown in FIG. 15. This embodiment is such that the tapered surface 12a of the middle section 12 of the seal ring 5 and the inclined wall section 25b of the storage concavity section 25 which is in contact with the tapered surface 12a are formed in a circular shape, respectively, but the space 40 is formed at the outer circumferential section of the heel section 11 similarly to the above.

Incidentally, in the embodiment of the present invention in which a space is provided at an outer circumference of the seal ring 5, the seal ring 5 is formed in such a shape that a pressure receiving are of the lip section 10 differs from a supporting area of the heel section 11. However, the present invention is not restricted to such a shape.

In other words, the present invention is also applicable to the conventional seal structure in which a pressure receiving area and a supporting area are of the almost same size, and this case will subsequently be described.

Figure 16:
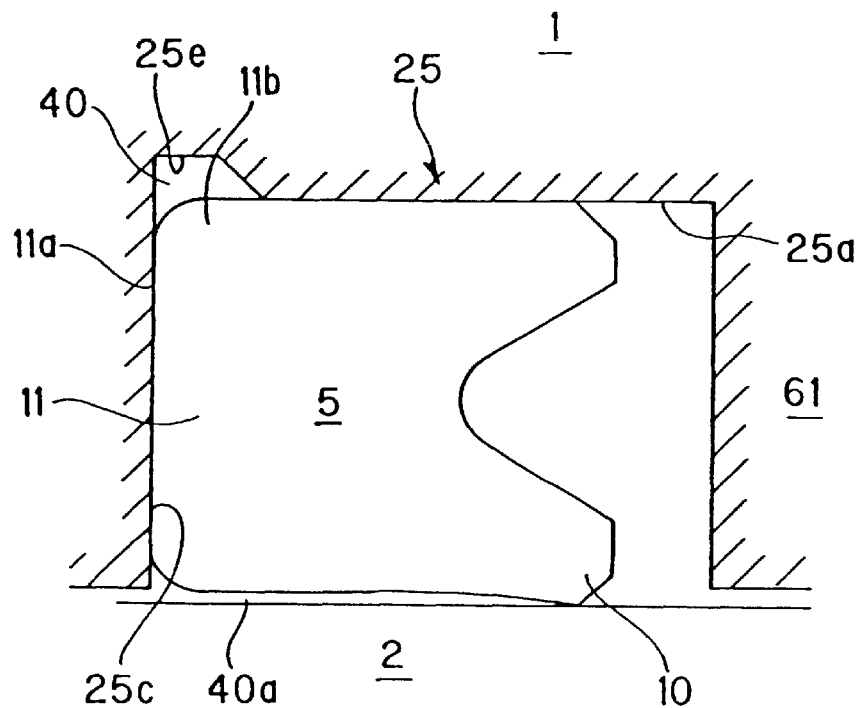
FIG. 16 is a sectional view of a principal part showing a shape according to an eleventh embodiment.

An eleventh embodiment of the present invention which is applied to the conventional seal ring having an annular cylindrical shape is shown in FIG. 16. A difference between the eleventh embodiment and the sixth embodiment is that the seal ring 5 has a pressure receiving area and a supporting area of the almost same size, and an annular wall 61 for limiting the movement of the seal ring 5 to the oil room 3 is installed at the lip section 10 of the seal ring 5.

More specifically, the storage concavity section 25 is constituted such that a diameter of the lip bottom wall 25a to which the lip section 10 of the seal ring 5 adheres closely is smaller than a diameter of a heel bottom wall 25e with the space 40 provided between the heel section 11 and the heel bottom wall 25e. Also in this case, when a high pressure acts on the lip section 10, a compressed and deformed part of the heel section 11 is absorbed by the space 40 and a deformation to the rod sliding surface side is prevented.

A capacity of the space 40 of the seal ring in this case will be described.

As to a required capacity of the space, an idea similar to that of the sixth embodiment is applied. According to a study made by the inventor, it is preferable that the total capacity of the space is 20 to 45 percent of a volume of the seal ring 5. It is also preferable that the total capacity of spaces on the outer circumference side of the seal ring 5 including the space 40 which exists on the outer circumference side is 1.0 times more than the total capacity of a space 40a on the inner circumference side.

Figure 17:
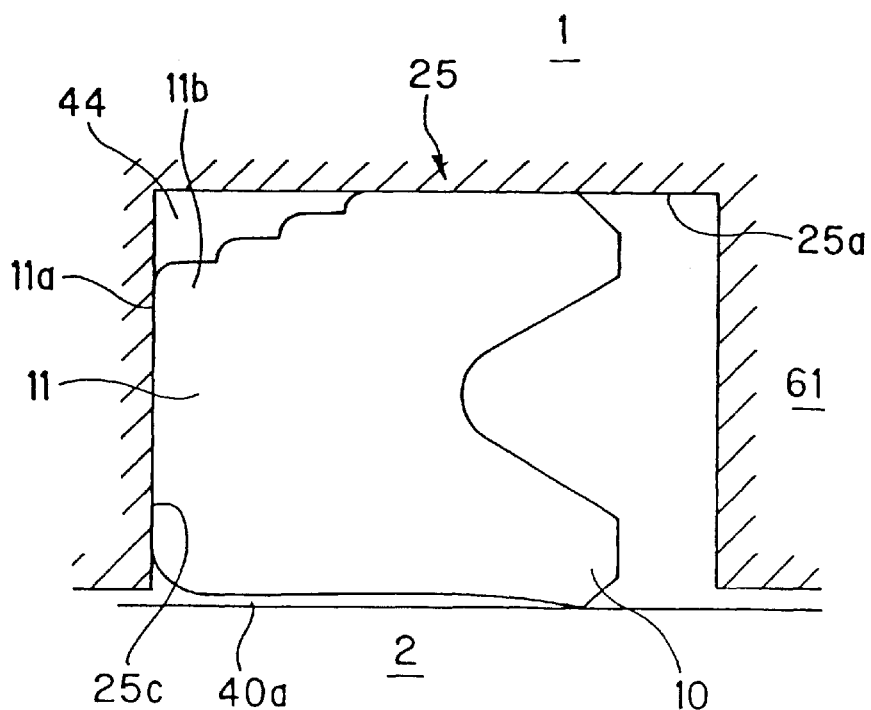
FIG. 17 is a sectional view of a principal part showing a shape according to a twelfth embodiment.

A twelfth embodiment is shown in FIG. 17. This embodiment is such that the outer circumferential section 11b of the heel section 11 of the seal ring 5 is formed by step sections having different diameters and a space 44 is provided between the step sections and the storage concavity section 25.

The seventh through twelfth embodiments show spaces whose shapes are different from that of the space according to the sixth embodiment which is a relief section for the seal ring 5 deformed by a pressure. It goes without saying that a capacity of the space is determined based on a required capacity of the space.

Figure 18:
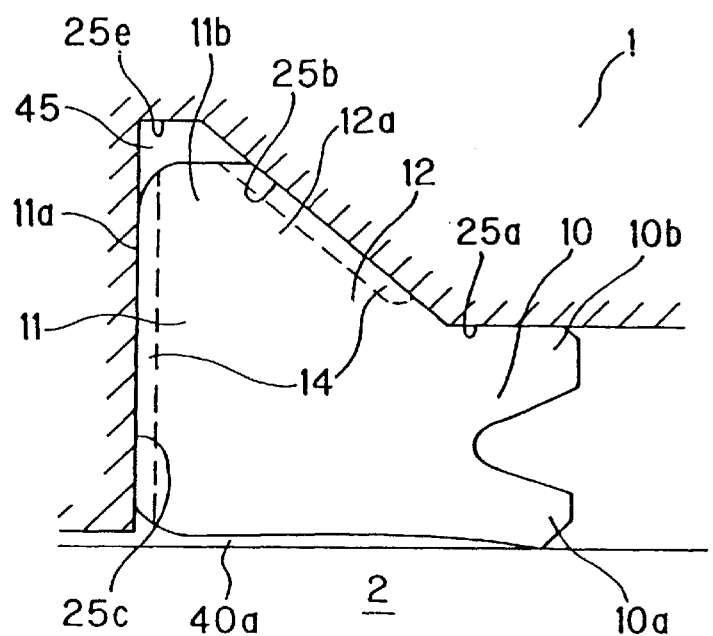
FIG. 18 is a sectional view of a principal part showing a shape according to a thirteenth embodiment.

Further, a thirteenth embodiment is shown in FIG. 18. This embodiment is such that there is provided the pressure draining groove 14 for discharging to the heel section 11 under an atmospheric pressure a pressure which exists between the outer circumferential section of the seal ring 5 and the inner circumferential section of the storage concavity section 25. Incidentally, a high pressure of the oil room 3 directly acts on the lip section 10, but the heel section 11 is normally maintained at a pressure similar to an atmospheric pressure because the high pressure is cut off.

Due to such constitution, a fluid which remains between the middle section 12 of the seal ring 5 and the inclined wall section 25b of the storage concavity section 25 and a filled fluid in a space 45 is discharged to the side of the heel section 11 through the pressure draining groove 14. It is thus possible to prevent the filled fluid from interrupting a deformation of the seal ring 5.

Figure 19:
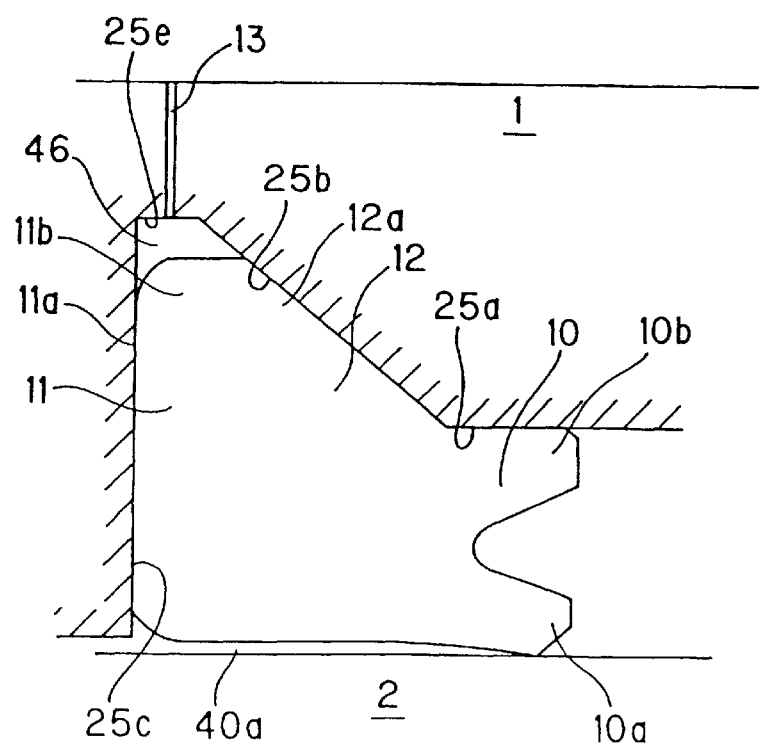
FIG. 19 is a sectional view of a principal part showing a shape according to a fourteenth embodiment.

A fourteenth embodiment is shown in FIG. 19. According to this embodiment, a pressure draining hole 13 for discharging a filled fluid which exists between the outer circumferential section of the middle section 12 of the seal ring 5 and the inner circumferential section (the inclined wall 25b and the heel bottom wall 25e) of the storage concavity section 25 to store the seal ring 5 is provided. The pressure draining hole 13 penetrates the cylinder head 1 and fronts on the outer circumferential section of the seal ring 5.

There is a fear that a filled fluid which exists in a space 46 is compressed when a pressure acts on it and a deformation of the seal ring 5 is stopped. However, this compression can be prevented by providing the pressure draining hole 13 as an escape for the filled fluid.

Next, a fifteenth embodiment of the present invention will be described with reference to FIG. 20. This embodiment is such that a control ring for controlling a deformation of a seal ring body 5a is arranged at the space 40.

Figure 20:
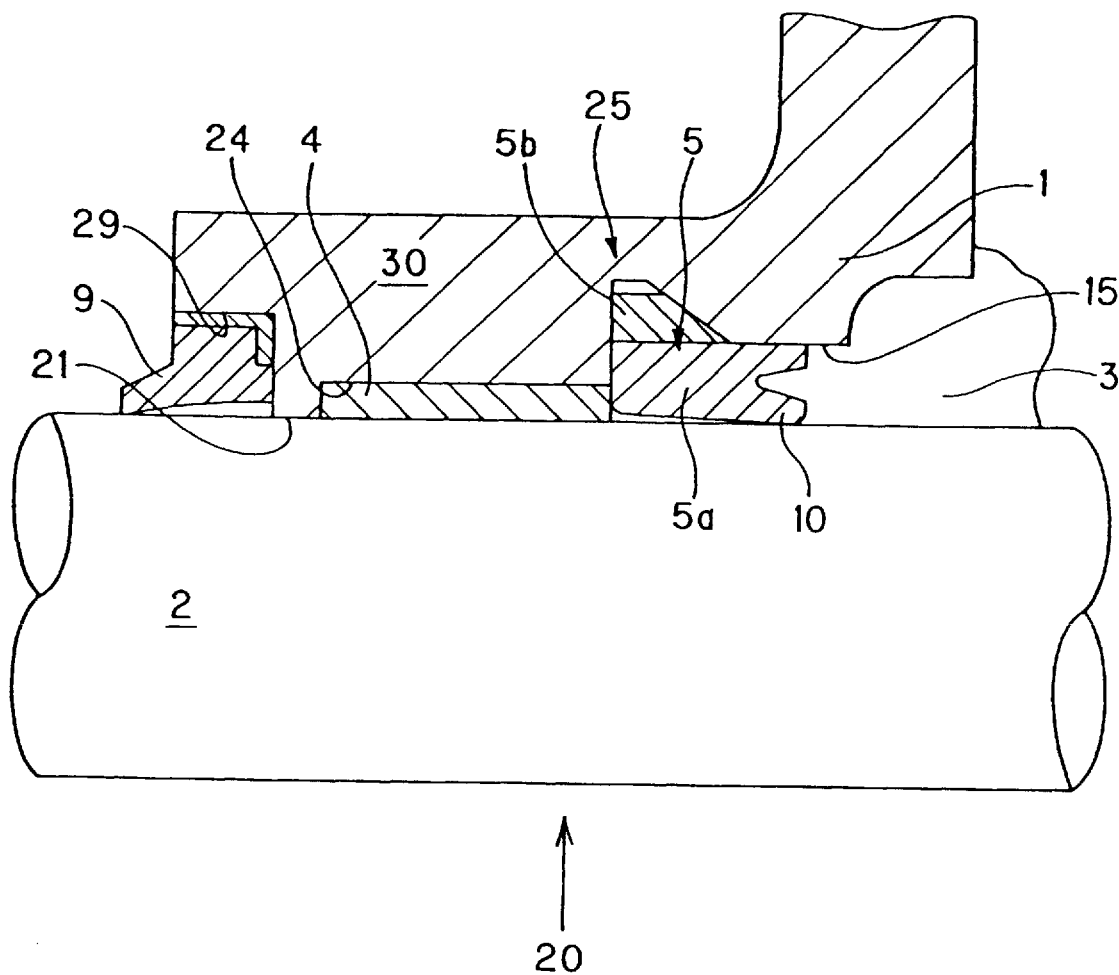
FIG. 20 is a block diagram showing a fifteenth embodiment.
Figure 21:
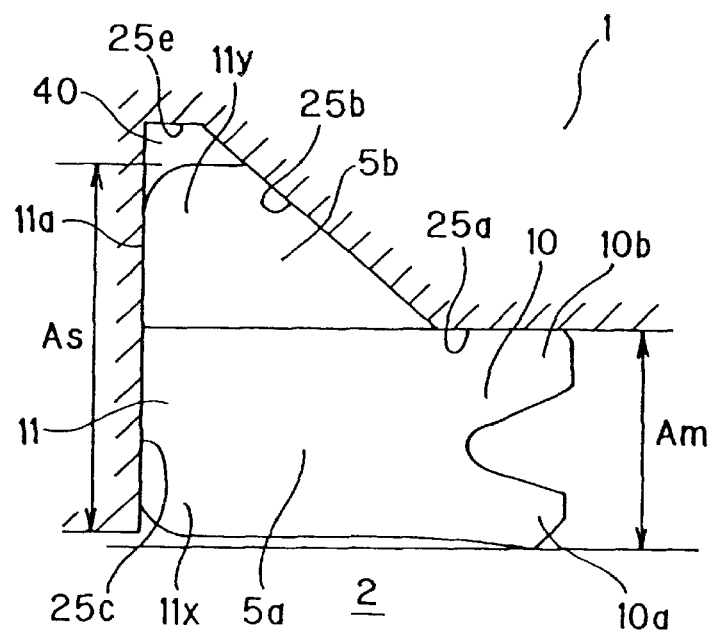
FIG. 21 is a sectional view of a principal part showing a detailed shape of a seal ring similarly.

As shown in FIGS. 20 and 21, the piston rod 2 of the hydraulic cylinder 20 slidably penetrates the sliding hole 21 of the cylinder head 1, and the bearing section 30 is formed at the penetration section. The bearing 4 and the seal ring 5 are arranged at the bearing section 30, and the seal ring 5 is stored in the storage concavity section 25 which is formed at the sliding hole 21.

The seal ring 5 is composed of the seal ring body 5a and a control ring 5b, which is installed at an outer circumferential section of the seal ring body 5a, for controlling a deformation of the seal ring body 5a. The lip section 10 having a diameter same as an inside diameter of the storage concavity section 25 is installed at the seal ring body 5a and it is attached to the rod side oil room 3 of the hydraulic cylinder 20.

The control ring 5b is installed on the outer circumference side of the seal ring body 5a and arranged in the storage concavity section 25. In order for the control ring 5b to allow and absorb a deformation of the seal ring 5 to the outer circumference side, the shape and the material of the control ring 5b are selected from among those which can cope with the deformation.

The constitution is as described above. Next, operations will be described.

The seal ring 5 is composed of the sealing body 5a which is provided with the lip section 10 having a sealing function and the control ring 5b for absorbing and controlling a deformation of the seal ring body 5a to the outside.

Figure 22:
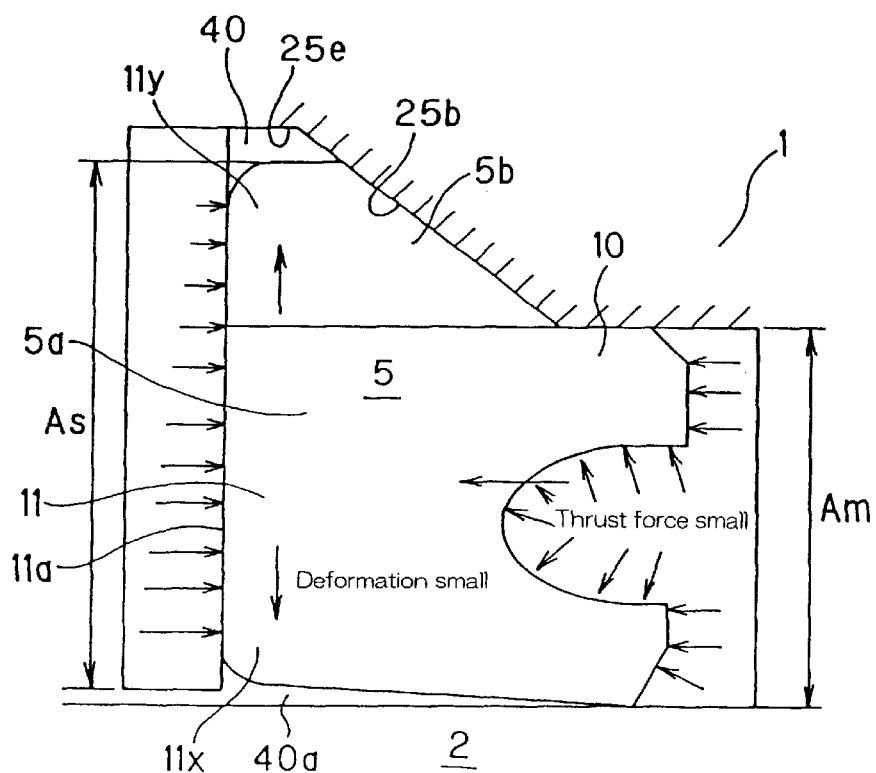
FIG. 22 is a typical view showing a working pressure and a deformation of the seal ring according to the fifteenth embodiment.

Due to such constitution, when a pressure acts on the lip section 10, it is possible to restrain thrust which acts on the seal ring 5 and reduce a pressure of the heel section 11 because the supporting area As of the heel section 11 is made larger than the pressure receiving area Am of the lip section 10 as shown in FIG. 22. Thus, it is certified from an analysis made by the inventor and the like that a deformation of the seal ring 5 can be minimized and a corner section 11x of the heel section 11 can be prevented to the most from projecting into the piston rod 2.

More specifically, the inventor and the like considered a deformation of a seal ring as a deformation of an annular cylindrical body, made an annular cylindrical model the lower surface of which is supported and the upper surface of which is loaded with a uniformly distributed load, and then analyzed and confirmed a deformation of the model by changing the supporting conditions of the inner circumference and outer circumference.

As a result, it is certified that if the inner circumference and outer circumference of the model are in a free state, both of these circumferences will expand the diameters, and if the inner circumference is in a free state and the outer circumference is in a restricted state, the inner circumferential diameter will shrink.

Judging from the results, it is confirmed that if the control ring 5b for absorbing and restraining a deformation of the seal ring body 5a to the outside is installed at an outer circumference of the seal ring body 5a and expansion of the outside diameter of the seal ring body 5a is controlled, the inside diameter will not be deformed at all.

Thus, if the shape, material characteristic, capacity, and the like of the control ring 5b are taken into consideration with effects of the seal ring 5 maintained, the outer circumferential section of the seal ring body 5a will be deformed in proportion to a pressure which acts on and also it will be possible to maintain a change in dimension of the inside diameter at approximately zero.

Thus, contact or engagement with the piston rod 2 is prevented and problems, such as an increase in friction and oil leakage, are solved.

Further, the control ring 5*b* and the seal ring body 5*a* are different parts, and therefore a deformation of the seal ring 5 can freely be controlled by freely changing the shape or material.

Further, by dividing the seal ring 5 into the seal ring body 5*a* and the control ring 5*b*, the shape of each part can be simplified, expenses for dies will be reduced and work efficiency will be improved.

Since a change in the size of the inside diameter of the seal ring 5 can be reduced, a stress which arises at the inside diameter section can be decreased, fatigue strength of the seal improves, and durability improves.

It is very effective to change a groove shape of the storage concavity section 25 at which the seal ring 5 is installed so as to control a deformation of the seal ring 5. Further, even after a shape of the seal ring 5 is determined, cutting can be performed according to the deformation and the deformation of the seal ring 5 can be controlled more precisely.

Figure 23:
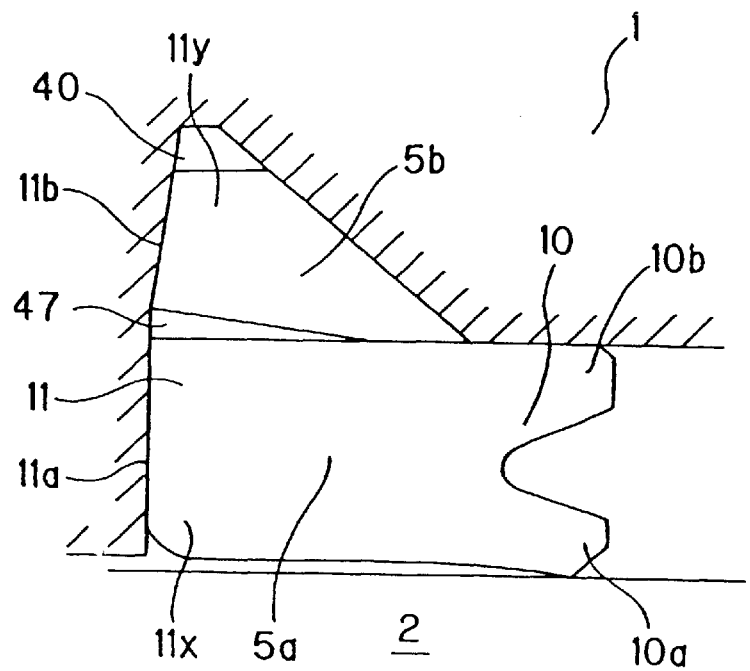
FIG. 23 is a sectional view of a principal part showing a shape according to a sixteenth embodiment.

A sixteenth embodiment is shown in FIG. 23. This embodiment is such that spaces 47 and 40 are provided at a part of a surface for joining the control ring 5*b* with the seal ring body 5*a* and between the control ring 5*b* and the storage concavity section 25, respectively. Incidentally, the supporting surface 11*b* which supports a heel section 11*y* of the control ring 5*b* is not on the same level with the supporting surface 11*a* of the heel section 11*x* of the seal ring body 5*a*. In other words, the supporting surface 11*b* forms an angle with the supporting surface 11*a*.

To have arranged the spaces 40 and 47 and the control ring 5*b* in such a manner is equivalent to that springs having different spring constants are arranged in series in a radial direction of the seal ring 5. Thus, it is possible to increase a degree of freedom of a spring system for controlling a deformation of the seal ring body 5*a*.

Figure 24:
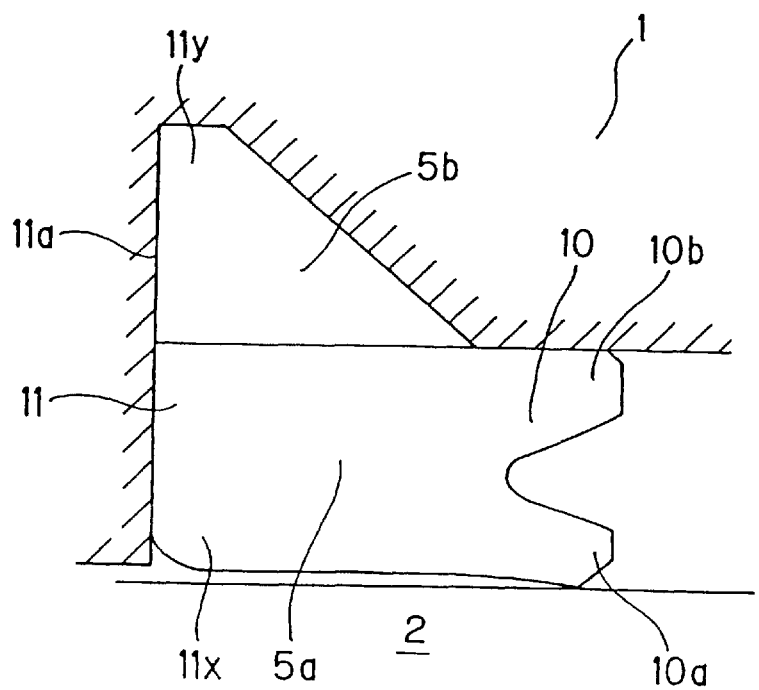
FIG. 24 is a sectional view of a principal part showing a shape according to a seventeenth embodiment.

A seventeenth embodiment is shown in FIG. 24. This embodiment is such that there is provided no space between the control ring 5*b* and the seal ring body 5*a* and between the control ring 5*b* and the storage concavity section 25. Due to such constitution, a deformation of the seal ring 5 can be absorbed and controlled.

Figure 25:
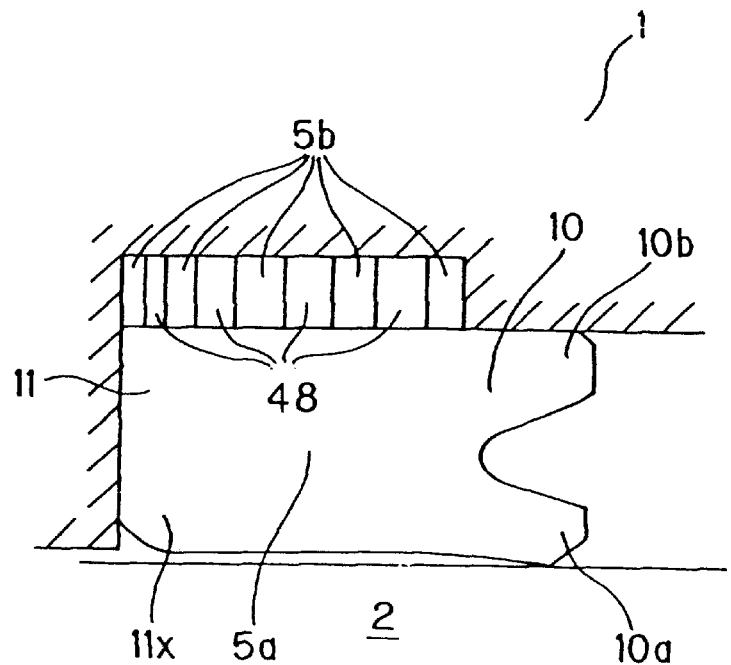
FIG. 25 is a sectional view of a principal part showing a shape according to an eighteenth embodiment.

An eighteenth embodiment is shown in FIG. 25. This embodiment is such that a hole 48 is radially bored in the control ring 5*b* from the center of an axis of the seal ring 5 and elastic characteristic of the control ring 5*b* most suitable for absorbing a deformation of the seal ring body 5*a* is prescribed based on a size of the hole 48 or a distribution density.

Incidentally, in this embodiment, the seal ring 5 is formed in such a shape that a pressure receiving area of the lip section differs from a supporting area of the heel section. However, the present invention is not restricted to such a shape.

In other words, the present invention is also applicable to the conventional seal structure in which a pressure receiving area and a supporting area are of the almost same size. This case will subsequently be described.

Figure 26:
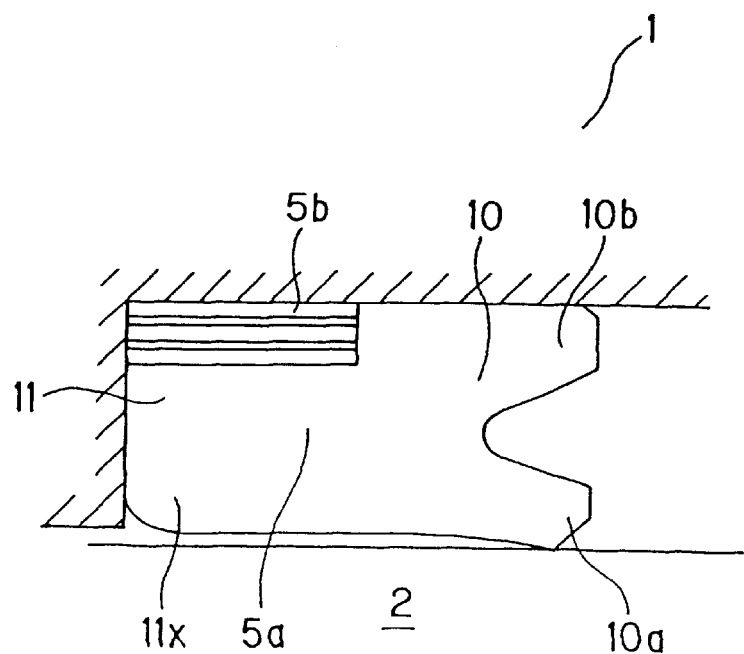
FIG. 26 is a sectional view of a principal part showing a shape according to a nineteenth embodiment.

A nineteenth embodiment is shown in FIG. 26. This embodiment is such that an outside diameter of the lip section 10 of the seal ring body 5*a* is larger than an outside diameter of the heel section 11*x*. Due to such constitution, a space is provided between the heel section 11*x* and the storage concavity section 25, a deformation of the seal ring 5 is led to a direction of the expansion of diameter, and the deformation is controlled by the control ring 5*b* which is provided at the space and formed, for example, by piling materials having different material characteristics in layers.

By providing the control ring 5*b* at the space, the seal ring 5 becomes an annular cylindrical body, thereby facilitating the processing of the storage concavity section 25.

Further, by using the control ring 5*b* which is formed by piling materials having different material characteristics in layers, it is possible to widen selectivity of the material characteristics.

Figure 27:
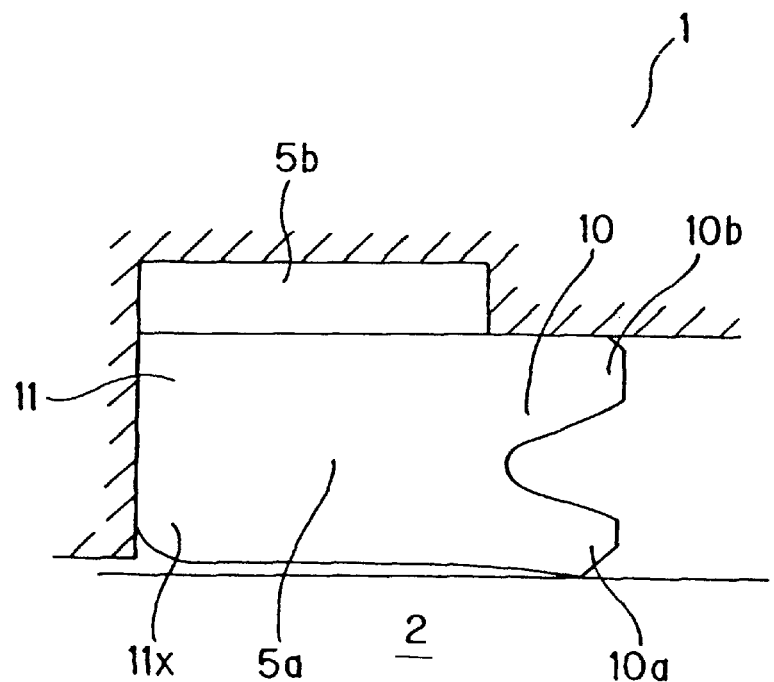
FIG. 27 is a sectional view of a principal part showing a shape according to a twentieth embodiment.

A twentieth embodiment is shown in FIG. 27. This embodiment is such that the control ring 5*b* is closely installed between the seal ring body 5*a* and the storage concavity section 25.

Figure 28:
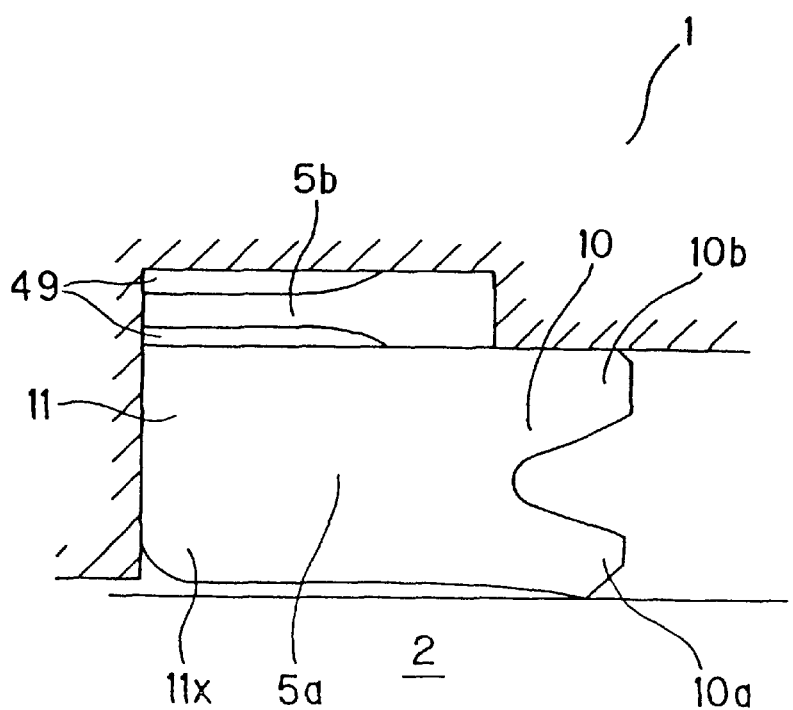
FIG. 28 is a sectional view of a principal part showing a shape according to a twenty-first embodiment.

A twenty-first embodiment is shown in FIG. 28. This embodiment is such that spaces 49 are provided at the respective parts of borders between the control ring 5*b* and the seal ring body 5*a* and between the control ring 5*b* and the storage concavity section 25.

Figure 29:
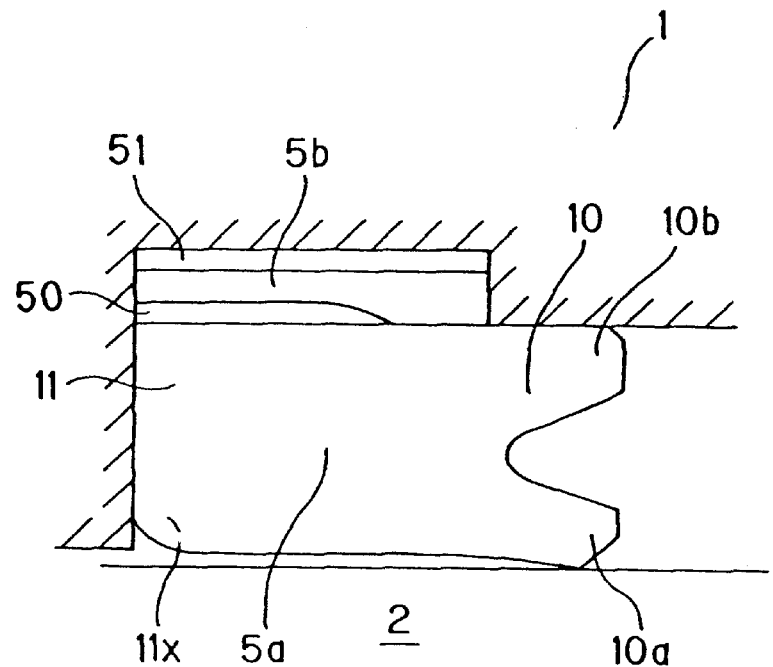
FIG. 29 is a sectional view of a principal part showing a shape according to a twenty-second embodiment.

A twenty-second embodiment is shown in FIG. 29. This embodiment is such that a space 50 is provided at a part of a boundary between the control ring 5*b* and the seal ring body 5*a* and a space 51 is provided at the entire circumference of a boundary between the control ring 5*b* and the storage concavity section 25.

Figure 30:
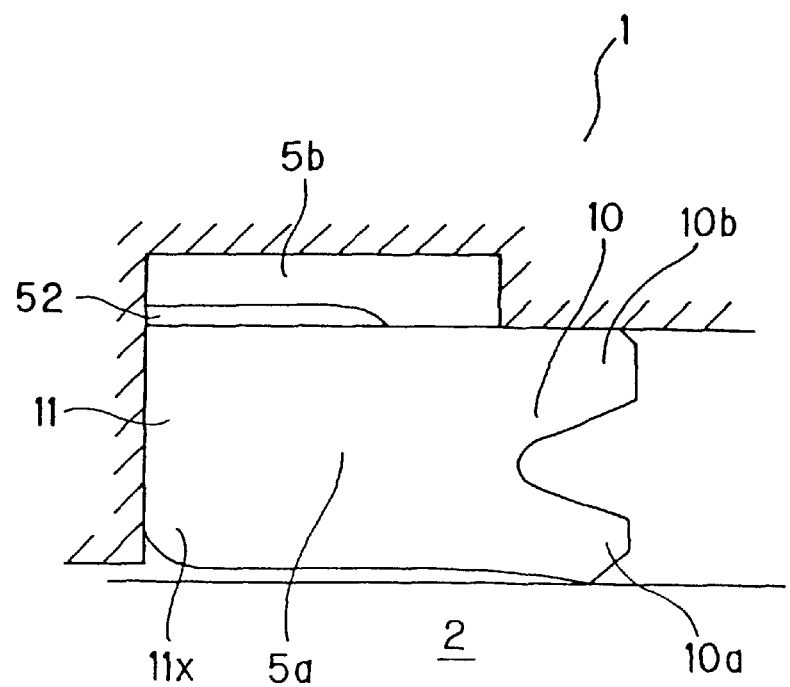
FIG. 30 is a sectional view of a principal part showing a shape according to a twenty-third embodiment.

A twenty-third embodiment is shown in FIG. 30. This embodiment is such that a space 52 is provided at a part of a boundary between the control ring 5*b* and the seal ring body 5*a*.

Figure 31:
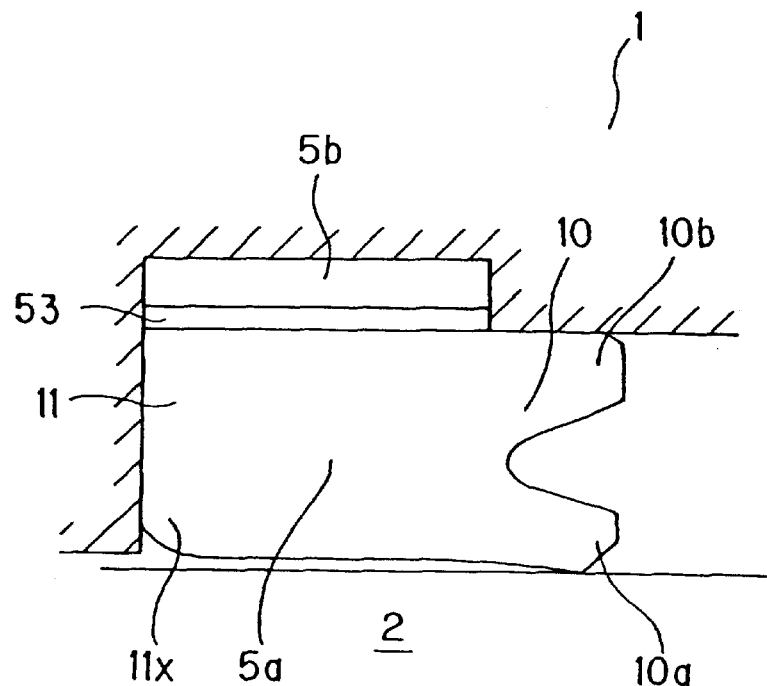
FIG. 31 is a sectional view of a principal part showing a shape according to a twenty-fourth embodiment.

A twenty-fourth embodiment is shown in FIG. 31. This embodiment is such that a space 53 is provided at the entire circumference of a boundary between the control ring 5*b* and the seal ring body 5*a*.

Figure 32:
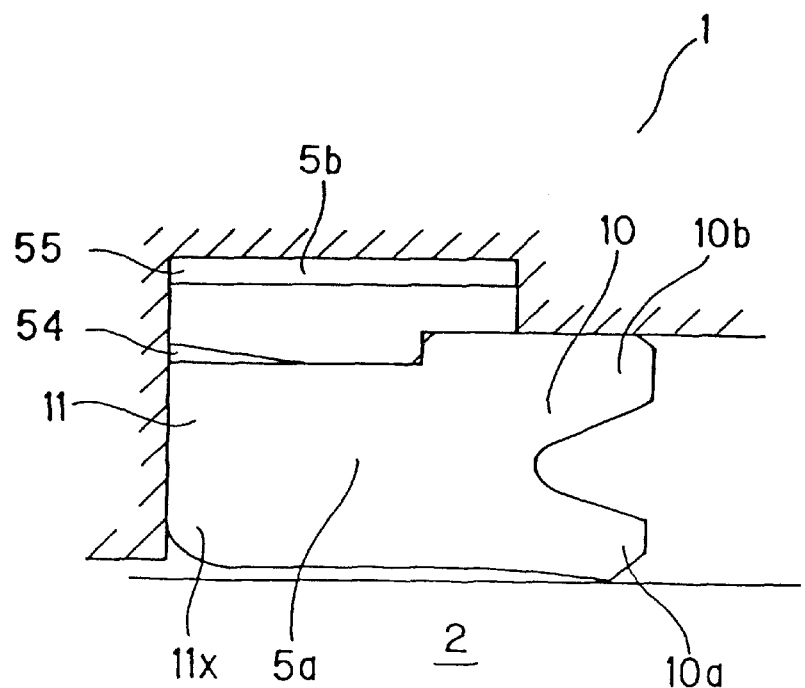
FIG. 32 is a sectional view of a principal part showing a shape according to a twenty-fifth embodiment.

A twenty-fifth embodiment is shown in FIG. 32. This embodiment is such that step sections having different diameters are installed at an outer circumferential section of the seal ring body 5*a*, the control ring 5*b* is formed along the step sections, a space 54 is provided at a part of the smaller diameter side of the outer circumferential section of the seal ring body 5*a*, and a space 55 is provided at the entire circumference of a boundary between the control ring 5*b* and the storage concavity section 25.

According to the twentieth through twenty-fifth embodiments, it is possible to cope with a deformation according to the form and quantity of the deformation of the seal ring body 5*a*.

A twenty-sixth embodiment will subsequently be described with reference to the accompanying drawings.

Figure 33:
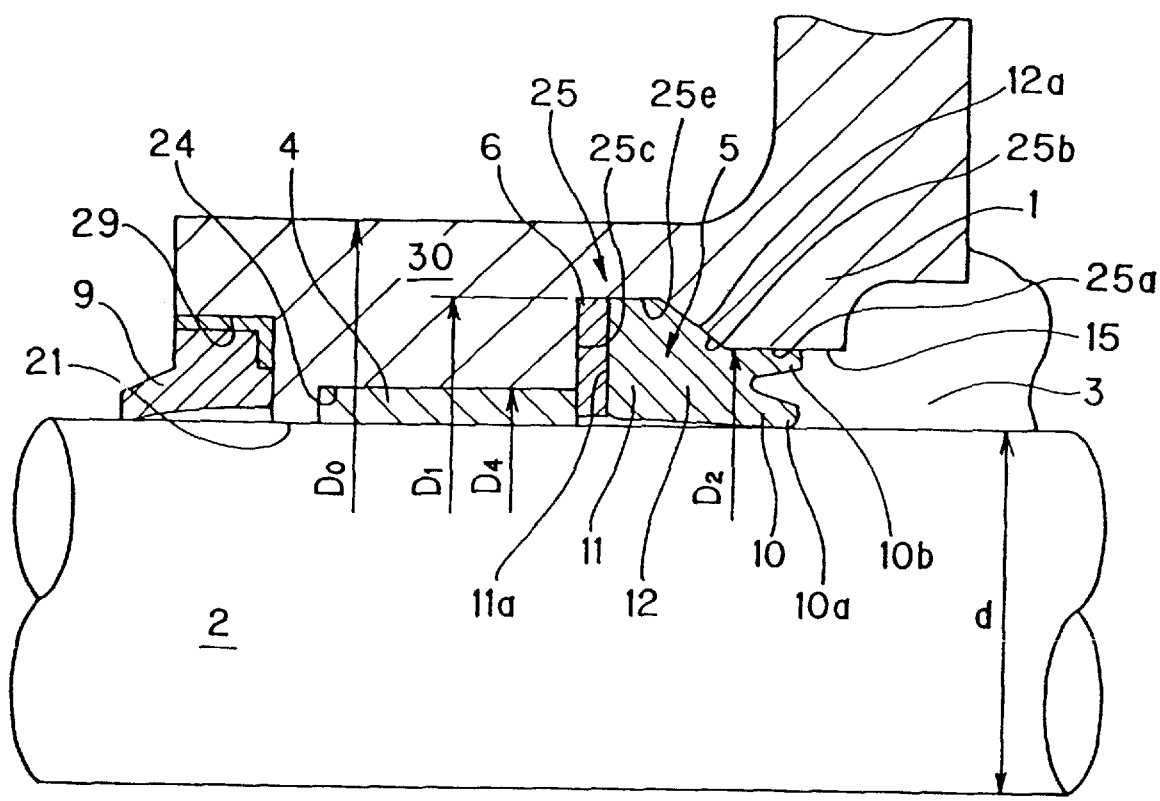
FIG. 33 is a block diagram showing a twenty-sixth embodiment.

In FIG. 33, the piston rod 2 having a diameter d of the hydraulic cylinder 20 slidably penetrates the sliding hole 21 of the cylinder head 1, the bearing section 30 is formed at the penetration section, and the oil room 3 into which hydraulic operating fluids are fed is installed between the cylinder head 1 and the piston rod 2.

A communicating hole 15 for connecting the storage concavity section 25 and the oil room 3 is provided at the bearing section 30, the communicating hole 15 and the lip bottom wall 25*a* of the storage concavity section 25 which is in contact with the outside diameter section of the lip section 10 are concentric circles, and the communicating hole 15 has a diameter almost same as that of the lip bottom wall 25*a*.

Incidentally, the backup ring 6 is used for receiving a pressure which applies to the seal ring 5 in this embodiment, but it is obvious that the back up ring 6 is dispensable.

The constitution is as described above. Next, assembling orders and operations will be described.

First, the bearing 4 is pressed from the right side of FIG. 33 into a groove 24 having a diameter $D_4$ which is provided at the cylinder head 1. Next, contaminations, such as metal powders, which are generated at the time of press fitting are removed. Since a groove 29 for installing a dust seal 9 which is open to the left side of FIG. 33 is the only seal installation groove in which contaminations are easily accumulated, removal of such contaminations can easily and securely be carried out as compared with the conventional structure.

After removal of the contaminations, the backup ring 6 and the seal ring 5 are fitted to the cylinder head 1 in the order named. For the installation, it will be sufficient if the backup ring 6 and the seal ring 5 pass the communicating hole 15 and the lip bottom wall 25a of the storage concavity section 25 which has an inside diameter $D_2$ and adheres closely to an outside diameter of the lip section 10 of the seal ring 5. Unlike the conventional example, it is not necessary to pass the sliding hole 21 which is in contact with a diameter d of the piston rod 2. Thus, a deformation amount of each part can be held down, damage of the parts will be prevented, a precision of installation of the parts will be improved, and work efficiency will be improved.

In the case of the lip bottom wall 25a with a diameter $D_2$ of the storage concavity section 25 being in contact with an outer circumference of the outer circumferential lip 10b which greatly contributes to the sealing performance, it is possible to change the cutting of the lip bottom wall 25a from boring to ordinary inside diameter cutting. Thus, it produces such effects that roughness of a surface to be cut and dimensional accuracy can be improved and the management is facilitated.

Similarly, it will be sufficient if the communicating hole 15 which has a diameter almost same as that of the lip bottom wall 25a of the storage concavity section 25 is processed simultaneously with cutting of the lip bottom wall 25e of the storage concavity section 25, whereby the cutting process can be shortened.

Further, when the lip bottom wall 25a of the storage concavity section 25 is cut, prepared hole cutting in diameter identical to that of the lip bottom wall 25a is carried out for the heel bottom wall 25e of the storage concavity section 25 and then boring is performed for the finishing. At this time, it will be sufficient if a cutting amount in boring is "$(D_1-D_2)/2$." This enables the improvement of a cutting precision and the reduction of expenses for cutting.

Further, since a shape of the seal ring 5 is not symmetrical with respect to a direction perpendicular to the central axis of the piston rod 2, an effect in preventing an assembling error can be expected.

Moreover, a pressure which acts on the lip section 10 is reduced because the pressure receiving area becomes small and a level of pressure resistance of the cylinder head 1 can be lowered. As a result, it is possible to reduce an outside diameter $D_0$ of the cylinder head 1, thereby being effective in reducing the weight and lowering costs.

Also, it is possible to enhance performance of a hydraulic cylinder by increasing a critical working pressure of a hydraulic operating fluid.

Finally, the assembly is completed when the dust seal 9 is pressed into the cylinder head 1 from the left side of FIG. 33.

Incidentally, the seal ring 5 and the backup ring 6 are installed between the oil room 3 and the bearing 4 in this embodiment, but the present invention is not restricted to such an arrangement. It is obvious that a similar effect can be expected even though the bearing 4 is arranged between the seal ring 5 and the oil room 3.

Operations according to a shape of the seal ring are similar to those of the first embodiment.

Figure 34:
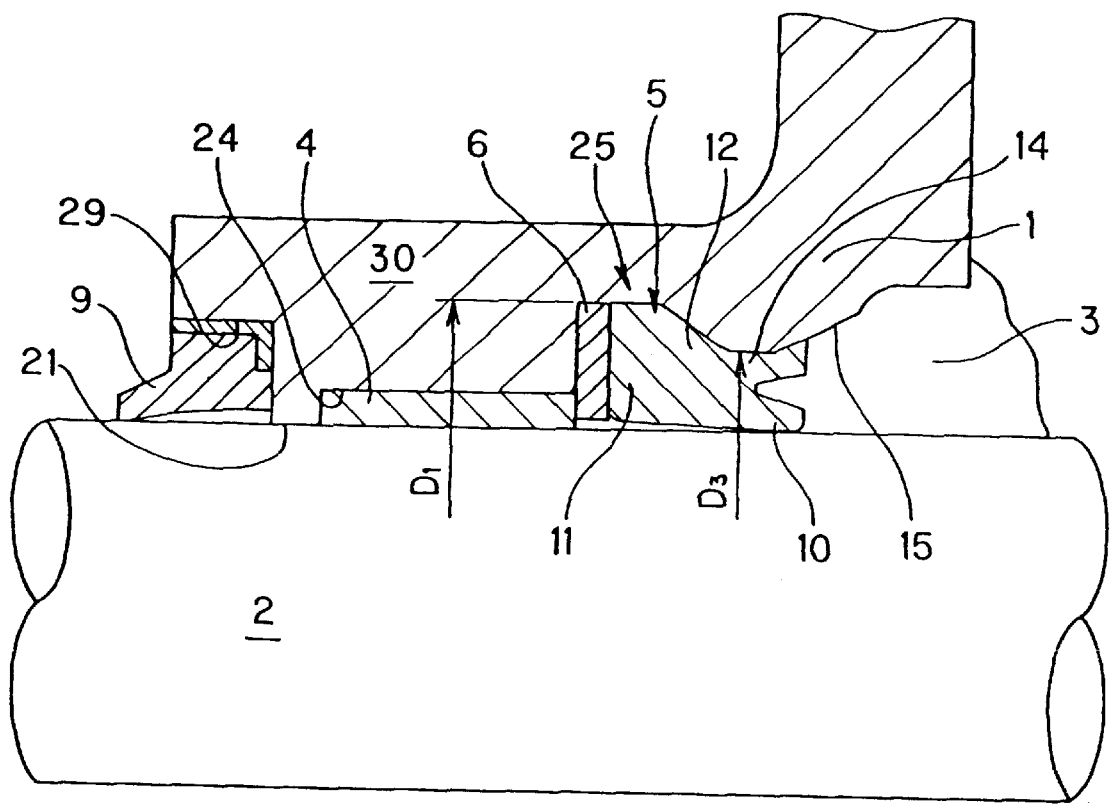
FIG. 34 is a block diagram showing a twenty-seventh embodiment.

A twenty-seventh embodiment is shown in FIG. 34. This embodiment is such that in the seal ring according to the first embodiment, the constricted part 14 (diameter $D_3$) the pressure receiving area of which is smaller than the supporting area of the heel section 11 is installed at the middle section 12.

Such constitution has the effects of releasing a dimensional restriction on the lip section 10 and enhancing a degree of the freedom of shape, maintaining the effects of the twenty-sixth embodiment in improving the assembly of the seal and the process of the cylinder head 1.

Figure 35:
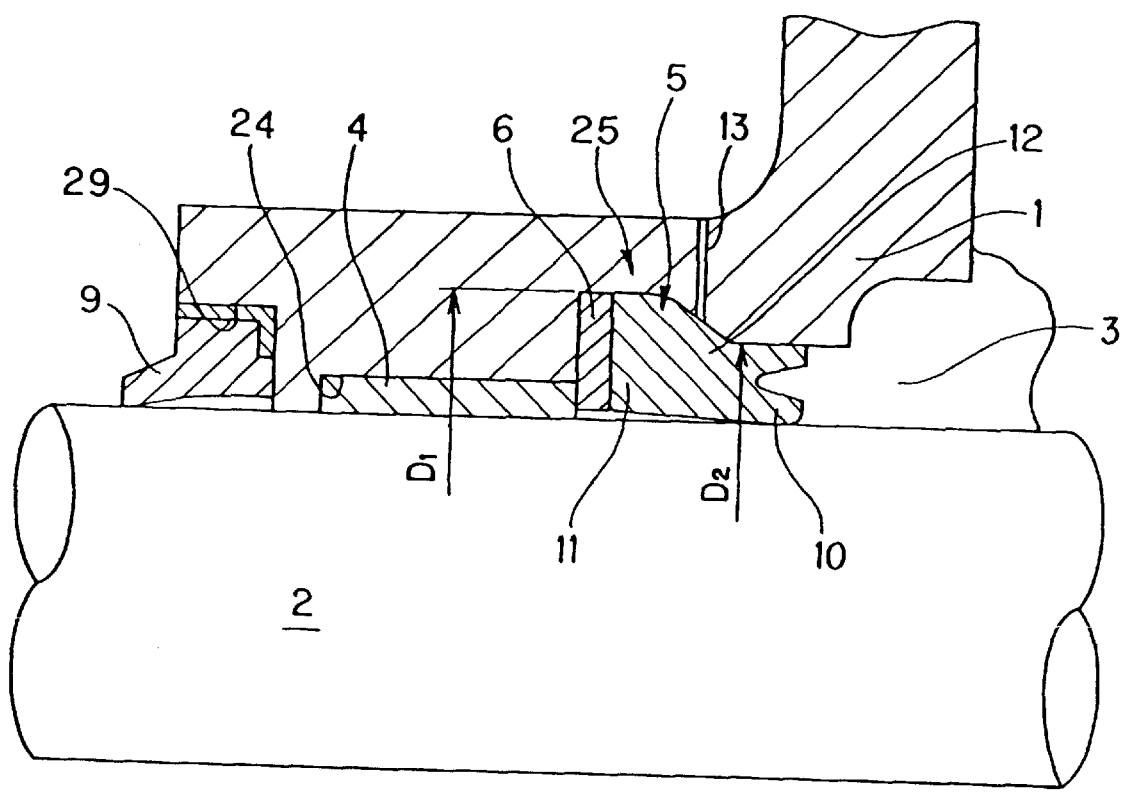
FIG. 35 is a block diagram showing a twenty-eighth embodiment.

A twenty-eighth embodiment is shown in FIG. 35. In this embodiment, in addition to the aspect of the first embodiment or the second embodiment, the pressure draining hole 13 for discharging a hydraulic operating fluid which exists between an outer circumferential section of the middle section 12 of the seal ring 5 and an inner circumferential section (the inclined wall 25b and the heel bottom wall 25e) of the storage concavity section 25 to store the seal ring 5 is provided in such a manner that the pressure draining hole 13 penetrates the cylinder head 1 and fronts on an outer circumferential section of the seal ring 5.

Due to such constitution, if there is a hydraulic operating fluid between an outer circumferential section of the middle section 12 of the seal ring 5 and an inner circumferential section of the storage concavity section 25 of the cylinder head 1 when a pressure acts, there will be a fear that the hydraulic operating fluid will be compressed and the pressure receiving area will increase. However, it is possible to provide the hydraulic operating fluid draining hole 13 as an escape for the hydraulic operating fluid to be compressed. Thus, when the hydraulic operating fluid leaks out between the inner circumferential section of the storage concavity section 25 of the cylinder head 1 and the outer circumferential section of the middle section 12 of the seal ring 5, the hydraulic operating fluid is discharged, and since the pressure receiving area of the lip section 10 is kept to be small, it is possible to prevent a pressure of the hydraulic operating fluid from acting on the outer circumferential section of the middle section 12 of the seal ring 5.

Incidentally, the hydraulic operating fluid draining hole 13 is provided at the cylinder head 1 in the twenty-eighth embodiment, but it is also preferable to provide at an outer circumferential section of the seal ring 5 a hydraulic operating fluid draining groove for leading to the heel side a hydraulic operating fluid which exists between an outer circumferential section of the seal ring 5 and an inner circumferential section of the storage concavity section 25 to store the seal ring 5.

INDUSTRIAL APPLICABILITY

As described above, when a hydraulic operating fluid acts on a lip section, thrust to deform a seal ring becomes small because a pressure receiving area of the lip section is rendered to be smaller than a supporting area of a heel section. Moreover, since the supporting area of the heel section is larger than the pressure receiving area of the lip section, a pressure which arises at the heel section is reduced. Thus, seal structure according to the present invention is useful for enhancing reliability on resistance to oil leakage of a hydraulic cylinder or the like.

What is claimed is:

1. A seal structure, comprising:
 a sliding member;
 a supporting member for slidably supporting the sliding member; and a seal ring provided between the sliding member and the supporting member, the seal ring being located in a storage concavity section, the seal ring having:

a heel section for supporting, at a wall surface of the storage concavity section, a pressure which acts on the seal ring, said heel section having an inner circumference, an outer circumference, and an annular supporting area between the inner circumference and the outer circumference;

a lip section on which a hydraulic operating fluid acts, the lip section having an inner circumference, an outer circumference, and an annular pressure receiving area between the inner circumference and the outer circumference of the lip section, the annular pressure receiving area being smaller than the annular supporting area; and a middle section having a tapered surface which is between and connected to the lip section and the heel section.

2. A seal structure according to claim 1, further comprising a retaining member for retaining the heel section of the seal ring, said retaining member being provided at the storage concavity section, wherein when the hydraulic operating fluid is not acting on a contact surface of the heel section and the retaining member, a space which becomes larger in a direction toward the outer circumference of the heel section is formed between the heel section and the retaining member.

3. A seal structure according to claim 1, wherein a hydraulic operating fluid draining groove, for leading to the heel section the hydraulic operating fluid which exists between the tapered surface of the middle section and an inner circumferential section of the storage concavity section, is provided.

4. A seal structure according to claim 1, wherein the sliding member is a piston rod, and wherein a space is provided between the inner circumference of the heel section and the piston rod, and a predetermined space for deforming and absorbing the seal ring is formed between the outer circumference of the heel section and an inner circumference of the storage concavity section.

5. A seal structure according to claim 1, wherein the sliding member is a piston rod, wherein a space is provided between the inner circumference of the heel section and the piston rod, wherein the pressure receiving area of the lip section and the supporting area of the heel section are almost identically formed, and wherein a predetermined space for deforming and absorbing the seal ring is formed between the outer circumference of the heel section and an inner circumference of the storage concavity section.

6. A seal structure according to claim 4, wherein a total capacity of the space between the inner circumference of the heel section and the piston rod and the predetermined space between the outer circumference of the heel section and the inner circumference of the storage concavity section is 10 to 35 percent of a volume of the seal rind, and a capacity of the predetermined space between the outer circumference of the heel section and the inner circumference of the storage concavity section is 0.6 times more than a capacity of the space between the inner circumference of the heel section and the piston rod.

7. A seal structure according to claim 5, wherein a total capacity of the space between the inner circumference of the heel section and the piston rod and the predetermined space between the outer circumference of the heel section and the inner circumference of the storage concavity section is 20 to 45 percent of a volume of the seal ring, and a capacity of the predetermined space between the outer circumference of the heel section and the inner circumference of the storage concavity section is 1.0 times more than a capacity of the space between the inner circumference of the heel section and the piston rod.

8. A seal structure according to claim 4, wherein the supporting member is a cylinder head, and the storage concavity section is defined in the cylinder head; and wherein the predetermined space between the outer circumference of the heel section and the inner circumference of the storage concavity section has a concave shape.

9. A seal structure according to claim 8, wherein the concave shape is formed in the seal ring.

10. A seal structure according to claim 4, wherein the outer circumference of the heel section is tapered.

11. A seal structure according to claim 4, wherein the predetermined space comprises an annular groove which forms a plurality of annular spaces disposed between the storage concavity section and the outer circumference of the heel section.

12. A seal structure according to claim 4, wherein a further space is provided between the middle section of the seal ring and the inner circumference of the storage concavity section which faces the middle section.

13. A seal structure according to claims 4, wherein the middle section of the seal ring and the inner circumference of the storage concavity section which is in contact with the middle section are formed in a shape of an arc.

14. A seal structure according to claim 4, wherein the outer circumference of the heel section of the seal ring is formed by a plurality of step sections having different diameters.

15. A seal structure according to claim 4, wherein the supporting member is a cylinder head, and wherein a pressure draining hole that penetrates the cylinder head for discharging a pressure which exists between an outer circumference of the seal ring and the inner circumference of the storage concavity section is provided.

16. A seal structure according to 4, wherein a pressure draining groove, for leading to a side of the heel section a pressure which exists between an outer circumference of the seal ring and the inner circumference of the storage concavity s is provided.

17. A seal structure according to claim 1, wherein a communicating hole for connecting an oil room and the storage concavity section is provided, the outer circumference of the lip section adhering closely to the communicating hole, the communicating hole having a diameter almost the same as that of the storage concavity section.

18. A seal structure according to claim 1, wherein said seal ring has a constricted part at an outer circumferential section thereof and between the lip section and the heel section; said constricted part having an inner circumference and an outer circumference, and an annular pressure receiving area between the inner circumference and the outer circumference of the constricted part, the annular pressure receiving area of the constricted part being smaller than the annular supporting area of the heel section; and a communicating hole larger than an outside diameter of the constricted part for connecting an oil room and the storage concavity section is provided; the outer circumference of the lip section adhering closely to the communicating hole.

19. A seal structure according to claim 17, wherein a hydraulic operating fluid draining hole, for discharging the hydraulic operating fluid which exists between an outer circumferential section of the seal ring and an inner circumferential section of the storage concavity section, is provided, the hydraulic operating fluid draining hole penetrating the supporting member and fronting on the outer circumferential section of the seal ring.

20. A seal structure according to claim 17, wherein a hydraulic operating fluid draining groove, for leading to a side of the heel section the hydraulic operating fluid which exists between an outer circumferential section of the seal ring and an inner circumferential section of the storage concavity section, is provided.

21. A seal structure, comprising:

a sliding member;

a supporting member for slidably supporting the sliding member; and a seal ring provided between the sliding member and the supporting member, the seal ring being located in a storage concavity section, said seal ring having:

a heel section for supporting, at a wall surface of the storage concavity section, a pressure which acts on the seal ring, said heel section having an inner circumference, an outer circumference, and an annular supporting area between the inner circumference and the outer circumference;

a lip section on which a hydraulic operating fluid acts, the lip section having an inner circumference, an outer circumference, and an annular pressure receiving area between the inner circumference and the outer circumference of the lip section, the annular pressure receiving area being smaller than the annular supporting area; and an elastic member which allows the seal ring to deform to an outer circumference side thereof and which absorbs the deformation.

22. A seal structure according to claim 21, wherein a void is provided at least either between the elastic member and a seal ring body of the seal ring or between the elastic member and the supporting member.

23. A seal structure according to claim 21, wherein the elastic member is closely stored in a space section.

24. A seal ring, comprising:

a heel section having an inner circumference, an outer circumference, and an annular supporting area between the inner circumference and the outer circumference;

a lip section on which a hydraulic operating fluid acts, the lip section having an inner circumference, an outer circumference, and an annular pressure receiving area between the inner circumference and the outer circumference of the lip section, the annular pressure receiving area being smaller than the annular supporting area; and a middle section having a straight tapered surface which linearly and outwardly extends between the outer circumference of the lip section and the outer circumference of the heel section.

25. The seal ring recited in claim 24, wherein said seal ring is composed of a ring body, and a control ring arranged around an outer circumference of said ring body, said control ring being adapted to absorb and restrain a deformation of said ring body.

26. The seal ring recited in claim 25, wherein said ring body and said control ring are separate components.

27. The seal ring recited in claim 25, wherein the straight tapered surface defines an outer surface of the control ring.

* * * * *